US012447477B2

(12) United States Patent
Krichtafovitch et al.

(10) Patent No.: US 12,447,477 B2
(45) Date of Patent: Oct. 21, 2025

(54) ELECTROSTATIC PRECIPITATOR ASSEMBLY AND ELECTROSTATIC AIR CLEANER WITH CONDUCTING SYNTHETIC POLYMER PLATES

(71) Applicant: AGENTIS AIR LLC, Columbia, MD (US)

(72) Inventors: Igor Krichtafovitch, Kiev (UA); Alan Viosca, Seattle, WA (US); Larry Rothenberg, Kensington, MD (US)

(73) Assignee: AGENTIS AIR LLC, Rockville, MD (US)

( * ) Notice: Subject to any disclaimer, the term of this patent is extended or adjusted under 35 U.S.C. 154(b) by 0 days.

(21) Appl. No.: 18/208,844

(22) Filed: Jun. 12, 2023

(65) Prior Publication Data

US 2024/0017272 A1  Jan. 18, 2024

Related U.S. Application Data

(60) Provisional application No. 63/351,339, filed on Jun. 10, 2022.

(51) Int. Cl.
*B01D 53/02* (2006.01)
*B03C 3/08* (2006.01)
(Continued)

(52) U.S. Cl.
CPC ............... *B03C 3/64* (2013.01); *B03C 3/08* (2013.01); *B03C 3/36* (2013.01); *B03C 3/41* (2013.01); *B03C 3/47* (2013.01)

(58) Field of Classification Search
CPC ......... B03C 2201/28; B03C 3/08; B03C 3/36; B03C 3/41; B03C 3/47; B03C 3/60; B03C 3/64
See application file for complete search history.

(56) References Cited

U.S. PATENT DOCUMENTS

| 895,729 A | 8/1908 | Cottrell |
|---|---|---|
| 3,915,672 A | 10/1975 | Penney |

(Continued)

FOREIGN PATENT DOCUMENTS

CN    105478235 A  *  4/2016

OTHER PUBLICATIONS

Translation of CN-105478235; Huang (Year: 2016).*
(Continued)

*Primary Examiner* — Christopher P Jones
(74) *Attorney, Agent, or Firm* — UNGERMAN IP PLLC; Mark E Ungerman

(57) ABSTRACT

An electrostatic air precipitator electrode system where the particle collecting electrode or the particle collecting electrode and the repelling electrode are made of a unitary conductive polymer material, preferably a conductive synthetic polymer material. Parts of the conductive synthetic polymer collecting electrode are treated to enhance the surface area. The treatment may be mechanical, chemical, or otherwise applied to enhance the surface area of the electrode. The repelling electrodes may also be made of a conductive polymer material, preferably a conductive synthetic polymer material. The advantage of having a unitary collecting electrode and a unitary repelling electrode both made of the same or similar material is that they may be recycled as a unit under recycling protocols requiring unitary materials and may be rigid enough to reduce the spacing that would have been required with foam based electrodes.

18 Claims, 16 Drawing Sheets

(51) Int. Cl.
 B03C 3/36 (2006.01)
 B03C 3/41 (2006.01)
 B03C 3/47 (2006.01)
 B03C 3/64 (2006.01)

(56) References Cited

U.S. PATENT DOCUMENTS

| | | | |
|---|---|---|---|
| 6,504,308 | B1 | 1/2003 | Krichtafovitch et al. |
| 6,664,741 | B1 | 12/2003 | Krichtafovitch |
| 6,937,455 | B2 | 8/2005 | Krichtafovitch et al. |
| 7,594,958 | B2 | 9/2009 | Krichtafovitch et al. |
| 9,488,382 | B2 | 11/2016 | Krichtafovitch |
| 9,682,384 | B2 | 6/2017 | Afanasiev et al. |
| 9,808,808 | B2 | 11/2017 | Wen et al. |
| 9,827,573 | B2 | 11/2017 | Afanasiev et al. |
| 10,668,483 | B2 | 6/2020 | Krichtafovitch et al. |
| 10,792,673 | B2 | 10/2020 | Krichtafovitch |
| 10,828,646 | B2 | 11/2020 | Rothenberg et al. |
| 10,875,034 | B2 | 12/2020 | Krichtafovitch |
| 10,882,053 | B2 | 1/2021 | Krichtafovitch |
| 10,960,407 | B2 | 3/2021 | Krichtafovitch et al. |
| 11,123,750 | B2 | 9/2021 | Krichtafovitch |
| 2010/0155025 | A1* | 6/2010 | Jewell-Larsen ....... H01L 23/467 165/96 |
| 2010/0236411 | A1* | 9/2010 | Chan .................. B03C 3/08 96/25 |
| 2015/0013541 | A1* | 1/2015 | Vandenbelt ............... B03C 3/47 96/98 |
| 2017/0354977 | A1 | 12/2017 | Krichtafovitch |
| 2018/0001548 | A1 | 1/2018 | Dietrich et al. |
| 2020/0360936 | A1 | 11/2020 | Lee et al. |
| 2020/0368384 | A1 | 11/2020 | Rosenørn et al. |
| 2023/0398551 | A1 | 12/2023 | Krichtafovitch et al. |
| 2023/0405603 | A1 | 12/2023 | Krichtafovitch et al. |
| 2024/0017272 | A1* | 1/2024 | Krichtafovitch .......... B03C 3/36 |

OTHER PUBLICATIONS

Translation of CN105478235.*
U.S. Appl. No. 63/351,339, filed Jun. 12, 2022, Igor Krichtafovich.
U.S. Appl. No. 63/351,411, filed Jun. 12, 2022, Igor Krichtafovich.
Conductive Polymer, Wikipedia, pp. 10, retrieved from https://en.wikipedia.org on Jun. 7, 2022.
Delahunt, Kevin, NAFA (National Air Filtration Association), Best Practice Guidelines, Filtration for Residential HVAC Industry, Feb. 26, 2023, 14 pgs., retrieved from www.nafahq.org.
EPA, Guide to Air Cleaners in the Home, 2nd Edition, Portable Air Cleaners Furnace and HVAC Filters, Jul. 2018, pp. 7, US, retrieved from www.epa.gov.
EPA, Residential Air Cleaners, A Technical Summary, 3rd Edition, Portable Air Cleaners Furnace and HVAC Filers, Jul. 2018, pp. 74, US, retrieved from www.epa.gov.
Jane H. Davidson & Peter J. Mckinney, Chemical Vapor Deposition in the Corona Discharge of Electrostatic Air Cleaners, Aerosol Science and Technology, Aug. 1998, vol. 29:2, Taylor & Francis Group, retrieved https://www.tandfonline.com.
Lew Harriman, et al., New Guidance for Residential Air Cleaners, ASHRAE Journal, Sep. 2019, pp. 8, retrieved from URL www.ashrae.org.
M.B. AWAD & GSP Castle, Ozone Generation in an Electrostatic Precipitator With a Heated Corona Wire, Journal of the Air Pollution Control Association, Apr. 1975, vol. 25, No. 4, Taylor & Francis Group, retrieved from https://www.tandfonline.com.
RTP Imagineering Plastics, Conductive Thermoplastics, Reliable and Safe Solutions Using Thermoplastic Technologies, pp. 16, retrieved from www.rtpcompany.com.

* cited by examiner

ELECTROSTATIC PRECIPITATOR ASSEMBLY AND ELECTROSTATIC AIR CLEANER WITH CONDUCTING SYNTHETIC POLYMER PLATES

RELATED APPLICATIONS

This present application claims priority to provisional Application No. 63/351,339 filed Jun. 10, 2022, the disclosure of which is expressly incorporated herein. The subject matter of this application relates to non-provisional application Ser. No. 18/208,847, which also claims priority to provisional Application No. 63/351,339 filed Jun. 10, 2022. The subject matter of this application relates to non-provisional application Ser. No. 18/208,845, which claims priority to provisional Application No. 63/351,411 filed Jun. 12, 2022. The subject matter of this application relates to non-provisional application Ser. No. 18/208,842, which claims priority to provisional Application No. 63/350,866 filed Jun. 9, 2022. The disclosures of all the applications mentioned above are expressly incorporated by reference herein.

BACKGROUND OF THE INVENTION

1. Field of Invention

The invention relates to electrostatic precipitators and more particularly to electrode systems for electrostatic precipitators.

2. Description of the Related Technology

Indoor air quality (IAQ) is the air quality within and around buildings and structures. IAQ is known to affect the health, comfort, and well-being of building occupants. Poor indoor air quality has been linked to sick building syndrome, reduced productivity, and impaired learning in schools. Poor indoor air quality can increase risks to the health of its occupants and can increase pathogen levels and increased mortality rates.

IAQ can be affected by gases (including carbon monoxide, radon, and volatile organic compounds), particulates, microbial contaminants (mold, bacteria, viruses), or any mass stressor that can induce adverse health conditions. Source control, filtration, and the use of ventilation to dilute contaminants are the primary methods for improving indoor air quality in most buildings. Residential units can further improve indoor air quality by routine cleaning of carpets and area rugs.

Determination of IAQ involves the collection of air samples, monitoring of human exposure to pollutants, collection of samples on building surfaces, and computer modeling of airflow inside buildings.

IAQ is part of indoor environmental quality (IEQ), which includes IAQ as well as other physical and psychological aspects of life indoors (e.g., lighting, visual quality, acoustics, and thermal comfort).

Indoor air pollution is a major health hazard. A major source of indoor air pollution is the burning of biomass for heating and cooking. This results in high concentrations of particulate matter.

Indoor workplaces are found in many working environments such as offices, sales areas, hospitals, libraries, schools, and preschool childcare facilities. At such workplaces, no tasks involving hazardous substances are performed, and they do not include high-noise areas. Nevertheless, employees may exhibit symptoms belonging to the sick building syndrome such as the burning of the eyes, scratchy throat, blocked nose, and headaches.

There are many bacteria of health significance found in indoor air and on indoor surfaces.

Many common building materials used before 1975 contain asbestos, such as some floor tiles, ceiling tiles, shingles, fireproofing, heating systems, pipe wraps, taping muds, mastics, and other insulation materials. Normally, significant releases of asbestos fiber do not occur unless the building materials are disturbed, such as by cutting, sanding, drilling, or building remodeling. Removal of asbestos-containing materials is not always optimal because the fibers can be spread into the air during the removal process. A management program for intact asbestos-containing materials is often recommended instead. When asbestos-containing material is damaged or disintegrates, microscopic fibers are dispersed into the air. Inhalation of asbestos fibers over long exposure times is associated with an increased incidence of lung cancer, in particular the specific form of mesothelioma. The risk of lung cancer from inhaling asbestos fibers is significantly greater for smokers, however, there is no confirmed connection to damage caused by asbestosis. The symptoms of the disease do not usually appear until about 20 to 30 years after the first asbestos exposure.

Asbestos is found in older homes and buildings but occurs most commonly in schools, hospitals, and industrial settings. Although all asbestos is hazardous, friable products, e.g., sprayed coatings and insulation, pose a significantly higher hazard as they are more likely to release fibers into the air. The US Federal Government and some states have set standards for acceptable levels of asbestos fibers in indoor air. There are particularly stringent regulations applicable to schools.

Atmospheric particulate matter, also known as particulates, can be found indoors and can affect the health of occupants. Authorities have established standards for the maximum concentration of particulates to ensure indoor air quality.

In 2015, experimental studies reported the detection of significant episodic (situational) cognitive impairment from impurities in the air breathed by test subjects who were not informed about changes in the air quality. Researchers at Harvard University and SUNY Upstate Medical University and Syracuse University measured the cognitive performance of 24 participants in three different controlled laboratory atmospheres that simulated those found in "conventional" and "green" buildings, as well as green buildings with enhanced ventilation. Performance was evaluated objectively using the widely used Strategic Management Simulation software simulation tool, which is a well-validated assessment test for executive decision-making in an unconstrained situation allowing initiative and improvisation. Significant deficits were observed in the performance scores achieved in increasing concentrations of either Volitive Organic Compounds ("VOCs") or carbon dioxide while keeping other factors constant. The highest impurity levels reached are not uncommon in some classroom or office environments.

The use of air filters can trap some air pollutants. The Department of Energy's Energy Efficiency and Renewable Energy section suggests that "[Air] Filtration should have a Minimum Efficiency Reporting Value (MERV) of 13 as determined by ASHRAE 52.2-1999." Cooling systems may include cooling coils that tend to gather condensate and may be wet. Those systems are known as sources of *Aspergillus niger*.

Air filters may be used to reduce the amount of dust that reaches the wet coils. When the dust contacts wet coils, the dust can stick to the coils and serve as food to grow molds on the wet coils and in the ventilation ducts. In addition, the dust can reduce the efficiency of the coils. One of the biggest problems in electrostatic filters is an unwanted occasional electrical discharge between the electrodes. ASHRAE standard 52.2 stipulates air purifier testing using carbon black, which contains electrically conductive dust. In some industrial areas, most notoriously in China, so-called "Asian dust" also carries dust that contains metal particles. After a certain time of exposure to such dust, a conductive layer forms on the inter-electrode surfaces. The conductive layer may cause an electrical short between the electrodes.

Traditional media filters and HEPA filters (also known as mechanical filters) have the drawback of energy inefficiency and decreasing efficiency over time due to the clogging of filters. In high-pollution environments, the use of filters may require more energy for air movement. In addition, the use of media filters in high-pollution environments may result in a need for frequent replacement of the media filters. Mechanical filters are expensive and better filtration always comes at a substantial increase in cost due to energy costs and media costs. Another drawback to mechanical filters is the noise attributed to air movement devices like fans. The back pressure created by blocking mechanical filters must be overcome by fans, which can be noisy and annoying, particularly in residential settings. The backpressure at a mechanical media filter increases over time as the mechanical filter is loaded thereby requiring more force to push air past or through the mechanical filters. More force comes at the expense of more noise and more energy.

Additional information is available from the US Environmental Protection Agency (EPA) and the American Society of Heating, Refrigerating and Air-Conditioning Engineers (ASHRAE). According to the EPA, the most effective ways to improve indoor air are to reduce or remove the sources of pollutants and to ventilate with clean outdoor air. In addition, research shows that filtration can be an effective supplement to source control and ventilation. Using a portable air cleaner and/or upgrading the air filter in your furnace or central heating, ventilation, and air-conditioning (HVAC) system can help to improve indoor air quality. Portable air cleaners, also known as air purifiers or air sanitizers, are designed to filter the air in a single room or area. A central furnace or HVAC filter is designed to filter the air throughout a home. Portable air cleaners and HVAC filters can reduce indoor air pollution; however, they cannot remove all pollutants from the air.

The following publications provide information on portable air cleaners and HVAC and furnace filters commonly used in homes.

The EPA has issued a short consumer guide covering portable air cleaners and furnace or HVAC filters used in a home. It includes tips for selecting a portable air cleaner, furnace filter, or HVAC filter. *Guide to Air Cleaners in the Home*, 2nd edition, August 2018 *Portable Air Cleaners, Furnace and HVAC Filters*, available online at: https://www.epa.gov/sites/production/files/2018-07/documents/guide_to_air_cleaners_in_the_home_2nd_edition.pdf the disclosure of which is expressly incorporated by reference herein.

The EPA has also issued guidance in the form of a technical summary *Residential Air Cleaners: A Technical Summary*, 3rd edition, August 2018 *Portable Air Cleaners Furnace and HVAC Filters*, available online at: https://www.epa.gov/sites/production/files/2018-7/documents/residential_air_cleaners_-_a_technical_summary_3rd_edition.pdf the disclosure of which is expressly incorporated by reference herein, focusing on air cleaners for residential use; it does not address air cleaners used in large or commercial structures such as office buildings, schools, large apartment buildings, or public buildings. In addition to providing general information about the types of pollutants affected by air cleaners, this document discusses the types of air-cleaning devices and technologies available, metrics that can be used to compare air-cleaning devices, the effectiveness of air-cleaning devices in removing indoor air pollutants, and information from intervention studies on the effects that air cleaners can have on health and health markers.

See also, Harriman, Stephens, Brennan—*New Guidance for Residential Air Cleaners-ASHRAE Journal September 2019 (pdf)* (September 2019), the disclosure of which is expressly incorporated by reference herein published by the American Society of Heating, Refrigerating and Air-Conditioning Engineers (ASHRAE). See also the NAFA Guide to Air Filtration, 6th edition, 2021, available here: https://netforum.avectra.com/eweb/shopping/shopping.aspx?site=nafa&webcode=shopping&prd_key=67ba3254-31ec-43ca-9ed8-b7f0e8849a83.

An electrostatic precipitator (ESP) is a filtration device that removes fine particles, like dust and smoke, from a flowing gas using the force of an induced electrostatic charge minimally impeding the flow of gases through the unit.

Traditional ESPs apply energy only to the particulate matter being collected and therefore are very efficient in their consumption of energy (in the form of electricity). Electrostatic precipitators use corona discharge to generate ions. Early use of corona discharge to remove particles from an aerosol was by Hohlfeld in 1824. However, electrostatic precipitators were not commercialized until almost a century later. In 1907 Frederick Gardner Cottrell, a professor of chemistry at the University of California, Berkeley, patented a device for charging particles and then collecting them through electrostatic attraction—the first electrostatic precipitator. See U.S. Pat. No. 895,729. Cottrell first applied the device to the collection of sulfuric acid mist and lead oxide fumes emitted from various acid-making and smelting activities.

At the time of Cottrell's invention, the theoretical basis for the operation was not understood. The operational theory was developed later in Germany, with the work of Walter Deutsch and the formation of the Lurgi company.

Electrophoresis is the term used for the migration of gas-suspended charged particles in a direct-current electrostatic field. The most basic precipitator contains a row of thin vertical wires, followed by a stack of large flat metal plates oriented vertically, with the plates typically spaced about 1 cm to 18 cm apart, depending on the application. The airstream flows horizontally through the spaces between the wires and then passes through the stack of plates.

A negative voltage of several thousand volts is applied between the wire and the plate. If the applied voltage is high enough, an electric corona discharge ionizes the air around the electrodes, which then ionizes the particles in the air stream.

The ionized particles, due to the electrostatic force, are diverted towards the grounded plates. Particles build up on the collection plates and are removed from the air stream.

Metal plate precipitators are commonly marketed to the public as air purifier devices or as a permanent replacement for furnace filters, but all have the undesirable attribute of being somewhat messy to clean. A negative side-effect of electrostatic precipitation devices is the potential production of toxic ozone and NO. However, electrostatic precipitators offer benefits over other air purification technologies, such as HEPA filtration, which require expensive filters and can become "production sinks" for many harmful forms of bacteria.

With electrostatic precipitators, if the collection plates are allowed to accumulate large amounts of particulate matter, the particles can sometimes bond so tightly to the metal plates that vigorous washing and scrubbing may be required to completely clean the collection plates. The close spacing of the plates can make thorough cleaning difficult, and the stack of plates often cannot be easily disassembled for cleaning. One solution, suggested by several manufacturers, is to wash the collector plates in a dishwasher.

Some consumer precipitation filters are sold with special soak-off cleaners, where the entire plate array is removed from the precipitator and soaked in a large container overnight, to help loosen the tightly bonded particulates.

A study by the Canada Mortgage and Housing Corporation testing a variety of forced-air furnace filters found that ESP filters provided the best, and most cost-effective means of cleaning the air using a forced-air system but were still subject to inconvenient plate cleaning requirements.

The Applicant has developed an ESP that uses a conducting layer sandwiched between layers of open cell material having a high electrical resistivity, as shown in U.S. Pat. Nos. 9,488,382 and 10,668,483 the disclosures of which are expressly incorporated by reference herein. Other patents assigned or licensed to Applicant include U.S. Pat. Nos. 9,682,384; 9,808,808; 9,827,573; 10,792,673; 10,828,646; 10,875,034; 10,882,053; 10,960,407; and 11,123,750. The disclosures of each of the identified patents are expressly incorporated by reference herein.

A known byproduct of corona discharge is the production of ozone. Because of the strongly oxidizing properties of ozone, ozone is a primary irritant, affecting especially the eyes and respiratory systems, and can be hazardous at even low concentrations.

To protect workers potentially exposed to ozone, U.S. Occupational Safety and Health Administration has established a permissible exposure limit (PEL) of 0.1 μmol/mol (29 CFR 1910.1000 table Z-1), calculated as an 8-hour time-weighted average. Higher concentrations are especially hazardous, and NIOSH has established an Immediately Dangerous to Life and Health Limit (IDLH) of 5 μmol/mol. Work environments where ozone is used or where it is likely to be produced should have adequate ventilation and it is prudent to have a monitor for ozone that will alarm if the concentration exceeds the OSHA PEL. The State of California has adopted air cleaner regulations to limit the amount of ozone produced by indoor air cleaning devices, to protect public health. The regulations require all air cleaner models marketed or sold in California after Oct. 18, 2010, to be tested and certified under the regulation. This included air cleaners sold via the Internet. ESPs may include ozone filters to absorb the ozone produced during corona discharge.

According to M. B. Awad, et al., *Ozone Generation in an Electrostatic Precipitator With a Heated Corona Wire, Journal of the Air Pollution Control Association,* 24 (4): 369 (April 1975), G. S. P. Castle, et al., "Ozone generation in positive corona electrostatic precipitators," *I.E.E.E. Trans.,* IGA-5 (4): 489 (1969), the disclosures of which are expressly incorporated by reference herein, two-stage electrostatic precipitators are widely used for high-efficiency collection of submicron particulates in air cleaning applications where recirculation of the air is required. In existing two-stage precipitators, a short positive corona section charges dust particles. The collection takes place in a downstream static electric field region. For best operation, it is important to ensure that the dust particles are charged to the maximum possible level and that the collection field strength is kept as high as possible. The upper level for the collection field strength is set by the electric breakdown strength of air. The precipitator is designed to produce the strongest possible field, short of breakdown, with a certain loading of dust on the collection plates.

The magnitude of the charge that is transferred to the particles is dependent on the corona current density that exists in the charging section. However, increasing the corona current also increases the amount of ozone that is generated by the discharge. Present American industrial standards limit the allowable exposure to $O_3$ to 0.10 ppm by volume for an 8-hour day. Therefore, to maintain acceptable $O_3$ concentrations for given air flows through the precipitator, it is necessary to keep the magnitude of the corona current below the spark threshold voltage level. The spark threshold voltage level is the voltage at which spark-over occurs. The limiting design parameters required to minimize $O_3$ generation involve selecting a corona wire of the smallest possible diameter compatible with mechanical strength. A reduction in the $O_3$ levels may be obtained by heating the corona wire.

U.S. Pat. No. 7,594,958, the disclosure of which is expressly incorporated by reference herein, shows a spark management device that includes a high-voltage power source and a detector configured to monitor a parameter of an electric current provided to a load device. In response to the parameter, a pre-spark condition is identified. A Switching circuit is responsive to the identification of the peak-spark condition for controlling the electric current provided to the load device to manage sparking. Management of sparking includes but is not limited to, reducing the occurrence of sparks, eliminating sparks, regulating sparks, timing sparks, and/or controlling the intensity of any sparks generated.

In conventional electrostatic air purifiers, all the electrodes with different electrical potentials are attached to the common case walls and are separated by a certain distance along the surface of the walls. Once conductive dust is collected on the wall it may cause an electrical short between the electrodes. Such a short may be called a "creeping" discharge along the surface of the wall. US 2018/001548 A1, the disclosure of which is expressly incorporated herein by reference, shows an electrostatic air cleaner designed to reduce "creeping" discharge by extending the effective creeping distance by configuring the electrodes with opposing polarity to be mounted at locations spaced apart from each other.

U.S. Pat. No. 9,488,382, the disclosure of which is expressly incorporated herein by reference, entitled "Electronic Air Cleaners and Associated Systems and Methods" shows an electrostatic air cleaner that collects and removes particles such as dust, pollen, smoke, pathogens, and other contaminants from the air by use of electric corona discharge. The air cleaner has an ionizing stage and a collection stage. The ionizing stage has exciting electrodes and corona electrodes. The collection stage has collecting electrodes and repelling electrodes. The collecting electrodes have a conductive core between open-cell sheets. The open-cell sheets have a much greater surface area than a flat metal plate.

Conductive polymers such as intrinsically conducting polymers (ICPs) are organic polymers that conduct electricity. Such compounds may have metallic conductivity or can be semiconductors. An advantage of conductive polymers is their processability, mainly by dispersion. Conductive polymers are generally not thermoplastics, i.e., they are not thermoformable. But, like insulating polymers, they are organic materials. They can offer high electrical conductivity but do not show similar mechanical properties to other commercially available polymers. The electrical properties can be fine-tuned using the methods of organic synthesis and by advanced dispersion techniques.

Linear-backbone "polymer blacks" (polyacetylene, polypyrrole, polyindole, and polyaniline) and their copolymers are the main class of conductive polymers. Poly(p-phenylene vinylene) (PPV) and its soluble derivatives have emerged as prototypical electroluminescent semiconducting polymers. Today, poly(3-alkylthiophenes) are the archetypical materials for solar cells and transistors.

Conductive polymers are prepared by many methods. Conductive polymers may be prepared by oxidative coupling of monocyclic precursors. Solubilizing functional groups may be added to some or all monomers to increase solubility.

Conductive polymers may be synthesized by chemical synthesis and electro (co) polymerization. Chemical synthesis means connecting the carbon-carbon bond of monomers by placing the simple monomers under various conditions, such as heating, pressing, light exposure, and catalyst. Electro (co) polymerization means inserting three electrodes (reference electrode, counter electrode, and working electrode) into a solution including reactors or monomers. By applying voltage to electrodes, a redox reaction to synthesize polymer is promoted. Electro (co) polymerization can also be divided into Cyclic Voltammetry and Potentiostatic method by applying cyclic voltage and constant voltage.

Conductive polymers have been incorporated into commercial displays and batteries. In addition, according to the Conductive Polymer article in Wikipedia, retrieved Jun. 7, 2022, conductive polymers are promising for use in organic solar cells, printed electronic circuits, organic light-emitting diodes, actuators, electrochromic materials, supercapacitors, chemical sensors, chemical sensor arrays, biosensors, flexible transparent displays, electromagnetic shielding, and possible replacements for the transparent conductor indium tin oxide. Another use is for microwave-absorbent coatings, particularly radar-absorptive coatings on stealth aircraft. Conducting polymers are rapidly gaining attraction in new applications with increasingly processable materials with better electrical and physical properties and lower costs. The new nanostructured forms of conducting polymers particularly, augment this field with their higher surface area and better dispersibility. Research reports showed that nanostructured conducting polymers in the form of nanofibers and nanosponges showed significantly improved capacitance values as compared to their non-nanostructured counterparts.

RTP Company of Winona, MN offers conductive compounds that span the surface resistivity spectrum from $10^1$ to $10^{12}$ ohms/square that can be formulated for injection molding or extrusion processes. RTP also offers anti-static compounds having a surface resistivity of $10^{10}$ to $10^{12}$ Ohms/sq. materials that have higher resistivities, including Antistatic compounds having surface resistivity of 10 and lower surface resistivity. In addition, it offers materials, as shown in its brochure entitled Conductive Thermoplastics-Reliable and Safe Solutions Using Thermoplastic Technologies, 10/2020. Copyright 2020 as follows:

Anti-static Compounds ($10^{10}$ to $10^{12}$ Ohms/sq.) provide a relatively slow decay of static charge—from just hundredths to several seconds—thus preventing accumulations that may discharge or initiate other nearby electrical events. These decay properties are inherent to the material and are not humidity dependent or limited by the fragility of anti-static coatings.

Static Dissipative Compounds ($10^6$ to $10^{12}$ Ohms/sq.) allow for the dissipation or decay of static charges at a faster rate than anti-static materials-generally within milliseconds. Materials that offer the "optimal" ESD protection ($10^6$ to $10^9$) are at the stronger end of the static dissipative range.

Conductive Compounds ($10^1$ to $10^6$ Ohms/sq.) with decay/dissipation rates measured in nanoseconds provide a ground pathway and bleed off strong static charges. These levels of conductivity are achieved by incorporating carbon fiber, high levels of carbon powder, or other conductive additives.

EMI/RFI Shielding Compounds ($10^1$ to $10^4$ Ohms/sq.) compounds are typically qualified by means other than electrical conductivity, as their true function is in blocking electromagnetic and radio frequency energy. These shielding compounds absorb and/or reflect electromagnetic energy, and thus provide shielding against electromagnetic interference while maintaining the design freedoms inherent in thermoplastic molding compounds.

Multiple technologies are available to impart conductive properties into thermoplastic resins that are otherwise insulative in nature, including antistatic, static dissipative, conductive, or EMI/RFI shielding properties. Customized compounds may use additive technologies ranging from carbon and metal particulates and/or fibers that form a conductive network throughout the base polymer, to Inherently Dissipative Polymers (IDPs) that alloy with various host resins.

SUMMARY OF THE INVENTION

It is an object to utilize conductive polymer material in an electrostatic precipitator electrode system, including for collecting and/or repelling electrodes. Some conductive polymers such as conductive thermoplastics may be formed by mixing a conductive material, for example, carbon with a base polymer to give the final manufactured material sufficient conductivity to be used for high-voltage electrostatic precipitator components. Conductive polymers may also be formed using a mix of conductive and non-conductive polymers, which may be of the same base polymer material.

It is a further object to utilize moldable conductive polymers in an electrostatic precipitator electrode system, including for collecting and/or repelling electrodes. RTP offers materials that have a surface resistivity of $10^1$ to $10^6$ Ohm/sq that it calls "Conductive compounds" and describes as "Conductive." For clarity, this specification uses "conductive" to describe a material with a surface resistivity of less than $10^{12}$ Ohm/sq and uses "Conductive ($10^1$-$10^6$)" to mean a material having a surface resistivity of $10^1$ to $10^6$ Ohm/sq). Using conductive polymers allows fabrication of a single structure that serves as a repelling electrode and includes one or more integral structures that are corona emission sites.

One object is to provide a fully recyclable particle collection assembly constructed using conductive polymers. There are synergistic benefits to using conductive polymers in electrostatic precipitator electrode components. Electrode sets could be cleanable or disposable at the option of the user. The utilization of conductive polymers allows for flexibility in terms of size/shape/construction and is cost-efficient. The term assembly is used to refer to an assembled product or an assembled portion of a product. The term structure is used to refer to a component, set of components, or an assembly.

It is a further object to provide an electrostatic precipitator with conductive plastic electrodes. The conductive plastic electrodes may be collecting electrodes and/or repelling electrodes. Electrical connections to the electrodes may be made in several ways. The electrode plates of the same polarity i.e., connected to one side of a power supply, may be mechanically and electrically connected to each other by conductive elements which are not in contact with electrode plates of the opposing polarity, i.e. connected to the opposite side of the power voltage level. For example, the collecting electrode plates may be connected to each other by conductive elements which are not in contact with the repelling electrode plates due to the configuration and geometry of the conductive elements, collecting electrode plates, and the repelling electrode plates. The connecting elements may be permanent pieces at the back of the assembly which connect the oppositely charged components. The electrodes may all be fixed and all components may be made of plastic.

According to a feature, a collecting assembly may have one electrode set, for example, the collecting electrode set that is reversible. The particles may settle on the collecting electrode plates with an uneven distribution. For example, a leading end of the collecting plates may have higher collected particle density at the leading end from an airflow perspective or may have larger particles collected on the leading end than on the trailing end. The useful life of a particle collecting electrode may be limited by collected particle saturation. The life of a particle collecting electrode plate with an uneven distribution may be extended by reorienting the collecting electrode plate.

The electrostatic air cleaner may have a collecting structure with conductive polymer components paired with a traditional ionizing assembly.

It is an object to provide an electrostatic particle collection structure made of components that are similar enough to be recyclable without disassembly and separation (open-cell foam layers such as melamine foam sandwiching a conductive core cannot be recycled without separation of the conductive core from the melamine foam).

It is a further object to provide an electrostatic particle collection structure with electrode plates that can be assembled without using materials that are too dissimilar to recycle together.

It is a further object to provide an electrostatic particle collection structure that may be formed in configurations and exhibit properties suitable for the collection and retention of particles by having enhanced surface areas and/or airflow disruption geometries to increase particle retention. Fabricated plates from synthetic polymer material facilitate configurations that permit individual collecting electrode plates, and/or entire electrode sets to be reoriented, for example, reversed. Accordingly, an electrode set could be removed and installed "backwards" to increase the life of the collector. Typically, the leading edge of a particle collector receives a higher portion of the large particles and dust load. Flipping the particle collector may increase service life by utilizing the trailing end of the particle collecting electrode.

It is a further object to provide a particle collecting assembly that may have plates that are spaced more closely than foam-based plates or foam and foil-based plates). The particle collecting electrode or the particle collecting electrode and the repelling electrode may be made of a unitary conductive polymer material, preferably a conductive synthetic polymer material, or of synthetic polymer material that exhibits sufficient rigidity to safely operate with plates arranged closer together than possible with the Applicants prior are electrode composed of foil sandwiched between melamine foam layers. Parts of the conductive synthetic polymer collecting electrode may be treated, molded, or extruded in a manner that results in an enhanced surface area. Treatment may be mechanical, chemical, or otherwise applied to enhance the surface area of the electrode. One or more electrodes may be comprised of, consist essentially of, or consist of any of the materials described or identified herein. The repelling electrodes may also be made of a conductive polymer material, preferably a conductive synthetic polymer material. The advantage of having a unitary collecting electrode and a unitary repelling electrode both made of the same or similar material is that they may be recycled as a unit under recycling protocols requiring unitary materials and may be rigid enough to reduce the spacing that would have been required with foam based electrodes.

It is a further object to provide ion emitting structures that are integrated with the electrostatic particle collection structure, for example integrated with the collecting and/or repelling electrode plates. Ionizing structures can advantageously be ion-emitting sites having a relatively smaller diameter than an oppositely charged electrode. According to prior ionizing sub-assemblies developed by the applicant, a corona electrode is a thin wire connected to a high-voltage power supply near an exciting electrode. The exciting electrode may be held at or near ground potential. Ions are emitted from the small diameter wire and are attracted toward an exciting electrode. When ions attach to particles, the particles may be entrained in the airflow into a collecting assembly and attracted to and deposited upon a collecting electrode at the same or similar voltage as the exciting electrode. This process is enhanced by the presence of repelling electrode plates interleaved with the collecting electrode plates. The corona electrode and repelling electrode may be integrated by utilizing conductive polymer for the repelling and/or collecting electrode and including ion emitting elements, sharp edges, or points as part of the structure of the repelling and/or collecting electrode. An injection molding process utilized to form components from conductive synthetic polymers may provide raised structures such as vertical knife-edge type ridges advantageously near the bleeding end (from an airflow perspective) of the repelling electrodes or sharply pointed cones extending from the planer surface of a repelling electrode.

It is a further object to take advantage of the molding and/or processing process to enhance the structural properties of the electrode plates by providing structures such as vertical ridges to enhance the stiffness and mechanical strength of the plates in addition to channels or grooves, and grooves can be provided in the surface in order to increase surface area, and in order to disrupt airflow and create areas with turbulence or lower airflow rates to enhance resistance to re-entrainment of particles attracted to a collecting electrode plate.

It is a further object to provide a repelling electrode that may be integrated with ion-emitting sites to avoid the necessity of a separate corona electrode in an electrostatic precipitator. Ion emitting sites or structures are portions of the electrode that have very small diameters. Molded ion emitting sites may be in the form of pointed cones or knife-like ridges. Features of reduced diameter sites may be formed in metallic or synthetic polymer repelling electrodes by mechanical disruption such as punching, cutting, or sawing the repelling electrode at or near the end of the electrode near the inlet end of the particle collecting structure. The repelling electrodes may also be made of a conductive polymer material, preferably a conductive synthetic polymer material. One alternative/additional possibility is utilizing the molding process to make lighter-weight or low-material-use components. For example, repelling electrodes that has a honeycomb structure instead of being configured as a flat plate. The electrostatic air precipitator electrode system may have a repelling electrode that has a honeycomb shape. It may be a transparent honeycomb shape and may produce the same electric field as a flat plate and would reduce the weight/material of the electrodes. The structure may be designed to have exactly the same electrical field strength.

The features described herein may be incorporated into electrode assemblies fabricated from conductive and highly conductive polymers or incorporated into electrode assemblies fabricated from polymers having static dissipative properties (surface resistivity of $10^6$ to $10^9$ Ohms/sq.) as described in U.S. patent application Ser. No. 18/208,845, filed on even date herewith by the same applicant, the disclosure of which is expressly incorporated by reference herein.

The exciting electrodes may be at the same or similar voltage as a collecting electrode and repelling electrodes, if separate from a corona electrode, may be at the same or similar voltage as the corona electrodes.

DETAILED DESCRIPTION OF THE PREFERRED EMBODIMENT

Before the present invention is described in further detail, it is to be understood that the invention is not limited to the embodiments described, as such may, of course, vary. It is also to be understood that the terminology used herein is for the purpose of describing embodiments only, and is not intended to be limiting, since the scope of the present invention will be limited only by the appended claims.

Where a range of values is provided, it is understood that each intervening value, unless the context clearly dictates otherwise, between the upper and lower limit of that range is encompassed within the disclosure. Where the stated range includes one or both limits, ranges excluding either or both of those included limits are also included in the disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention is described in detail concerning preferred embodiments, and it will now be apparent from the foregoing to those skilled in the art that changes, and modifications may be made without departing from the invention in its broader aspects, and the invention, therefore, as defined in the claims, is intended to cover all such changes and modifications that fall within the true spirit of the invention.

Figure 1:
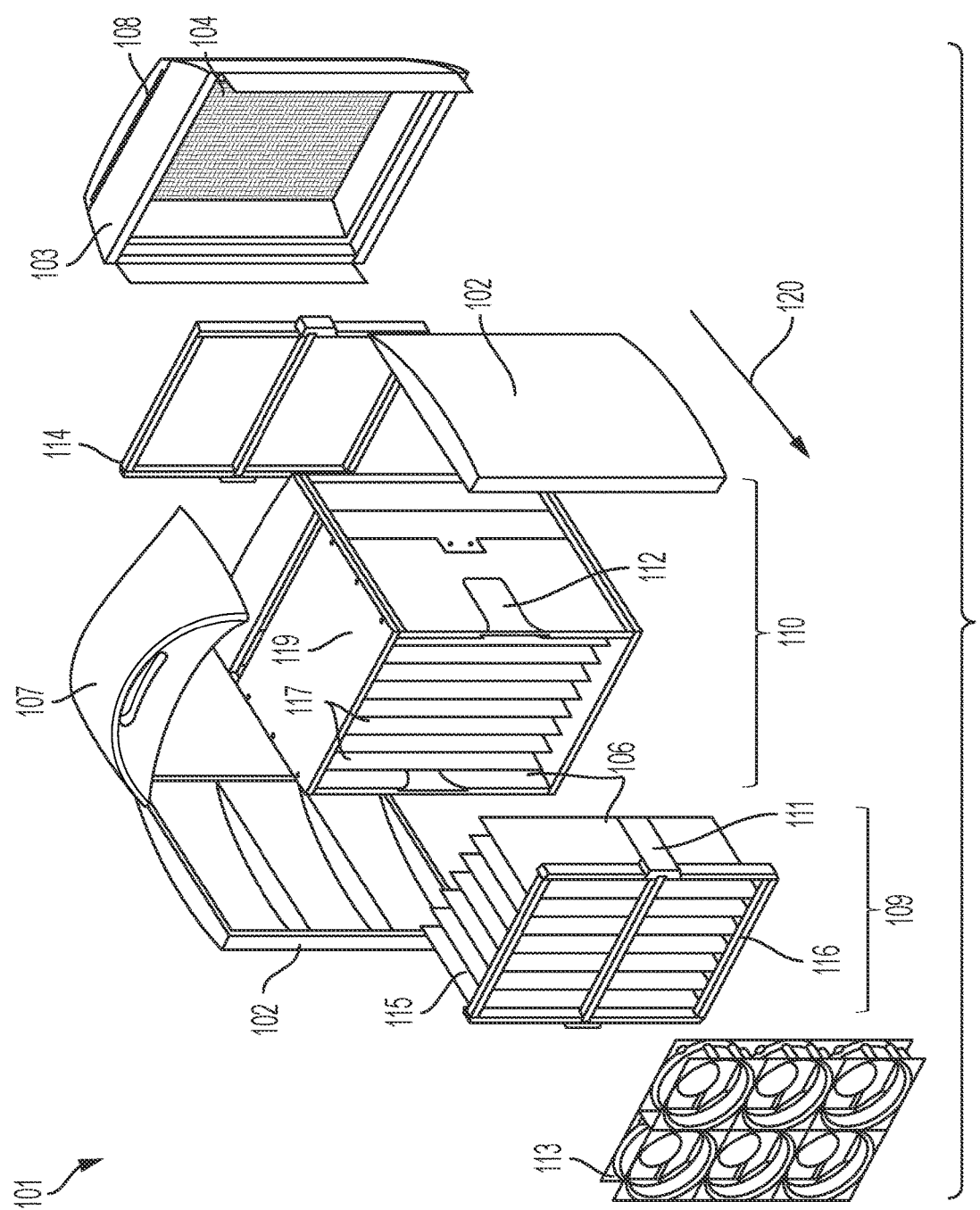
FIG. 1 shows the mechanical schematics of an embodiment of an electrostatic air cleaner.

FIG. 1 schematically shows an exploded view of an electrostatic air cleaner 101. The exploded view of FIG. 1 shows side panels 102 of a case and a top panel 107. An ionizer assembly 103 may be in the front (inlet) portion of the electrostatic air cleaner 101. A particle collection structure 106 may be in the main body of the electrostatic air cleaner 101. The ionizer assembly 103 may include emitting wires (not shown in FIG. 1, see FIG. 2). The emitting wires are referred to as corona wire(s) or corona electrode(s). A mesh-like exciting electrode 104 is shown as part of the ionizer assembly 103. The exciting electrode 104 is arranged to cooperate with the corona electrode in establishing a corona field and generating ions. One mounting arrangement for the exciting electrode may include a slot 108 to receive or extract the exciting electrode 104. The exciting electrode 104 (which is preferably earth grounded) may be easily removed through slot 108 for periodic cleaning. A topside panel 107 may include a handle. A high voltage power supply and controls may be mounted in the topside panel. The air cleaner 101 need not be configured with separate ionizer and particle collection assemblies. The components may be installed in housing without being separated into assemblies.

The particle collection structure 106 may include a particle collecting electrode assembly 109 and a particle repelling electrode assembly 110. When the particle collecting electrode assembly 109 is inserted into the particle collecting structure housing 119, rails 111 may slidably engage slots 112. The particle repelling electrode assembly 110 may be secured on the opposite side of the collecting structure housing 119 from the mounting end of the particle collecting electrode assembly 109. The particle collecting electrode assembly 109 is preferably mounted to the particle collection structure housing 119 at the end opposite the ionizer assembly 103. A fan assembly 113, may be included in the electrostatic air cleaner 101 if needed. The fan assembly may not be needed if the ionizer assembly 103 and the particle collection structure 106 of the electrostatic air cleaner 101 is in a constrained airflow path such as HVAC ductwork, in an HVAC vent, or an exhaust vent. The intended airflow direction during normal operation is shown by arrow 120.

The collecting electrode assembly 109 may include a set of parallel collecting electrode plates 115 mounted to a collecting electrode mounting structure 116. The embodiment illustrated in FIG. 1 has the collecting electrode plates 115 connected at one edge and extending from the collecting electrode mounting structure 116. The repelling electrode assembly 110 may have a similar but reversed configuration having a plurality of repelling electrode plates 117 connected to a repelling electrode mounting structure 114.

The collecting electrode assembly 109 may include a mounting rail 111.

Figure 2:
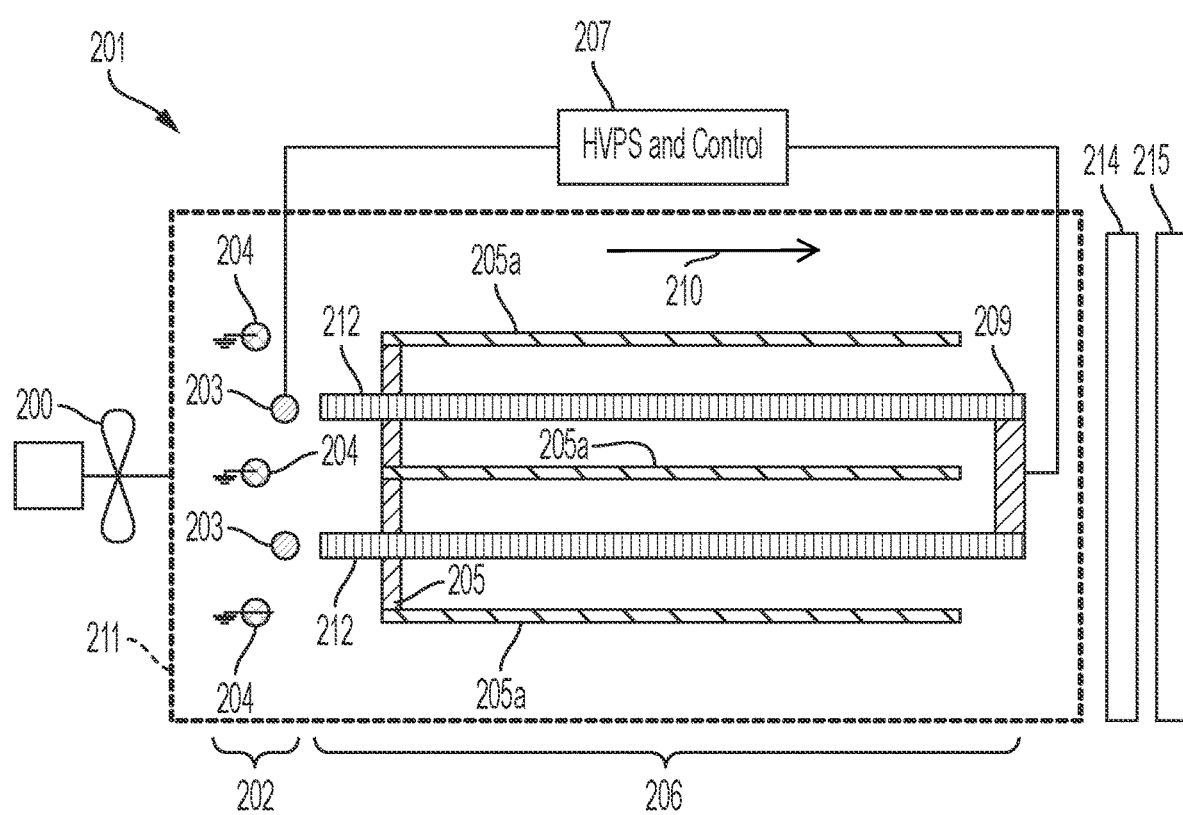
FIG. 2 shows the electrical schematics of an embodiment of an electrostatic air cleaner.

FIG. 2 schematically shows a simplified view of the electrode geometry of an electrostatic air cleaner 201. One or more fans 200 may be provided to control airflow. An ionizing stage 202 may be provided to generate ions. The intended airflow direction during normal operation is shown from left to right by arrow 210. The ionizing stage 202 may include one or more corona electrodes 203 which may be provided near an intake 211 of the electrostatic air cleaner 201. One or more exciting electrodes 204 may be provided near an intake 211 of the electrostatic air cleaner 201 and positioned to co-act with the corona electrode(s) 203. Corona electrode 203 may be a wire which is routed across the airflow path several times for example in front of each collecting electrode plate 212. The exciting electrode 204 may be a conductive grid or bars that are connected to the ground or a ground side of a high-voltage power supply in the high-voltage power system 207. The high-voltage power system 207 may also include a controller and one or more sensors and controls.

A particle collection stage 206 may be located downstream from the ionizing stage 202. The particle collection stage 206 may include a repelling electrode assembly 205 having one or more repelling electrode plates 205a and a collecting electrode assembly 209 having one or more collecting electrode plates 212. The collecting electrode assembly 209 is positioned to co-act with the repelling electrode assembly 205 so that charged particles move away from the repelling electrode and land on the collecting electrode plates 212. The collecting electrode plates 212 may alternate with parallel repelling electrode plates 205a in the particle collection stage 206. The ionizing stage 202 and the particle collection stage 206 are in an airflow path. The electrostatic air cleaner 201 may include one or more fans 200 to induce or affect airflow or the electrostatic air cleaner 201 may be in a constrained space with an externally induced airflow.

The airflow path may be selectively blocked by closing a blocking structure 214, such as shutters or a blast gate under the control of the high-voltage power system 207 or another controller.

An Amphenol SM-PWM-01A SMART Dust Sensor or a Waveshare Dust Sensor Detector Module with Sharp GP2Y10$^{10}$AU0F are examples of the type of sensors that may be employed. The control system may also detect or use other environmental parameters including, but not limited to, elevation, air humidity, etc. Additional measures of environmental parameters or conditions allow for complicated and comprehensive power source control.

Figure 4:
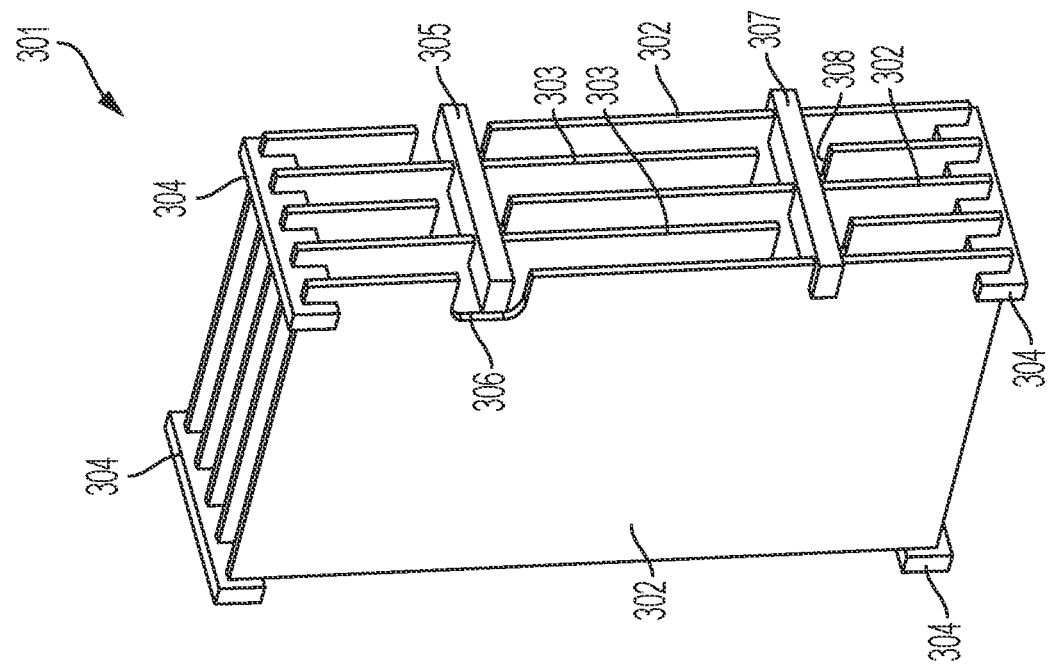
FIG. 4 shows a different perspective view of the particle collection assembly shown in FIG. 3.
Figure 3:
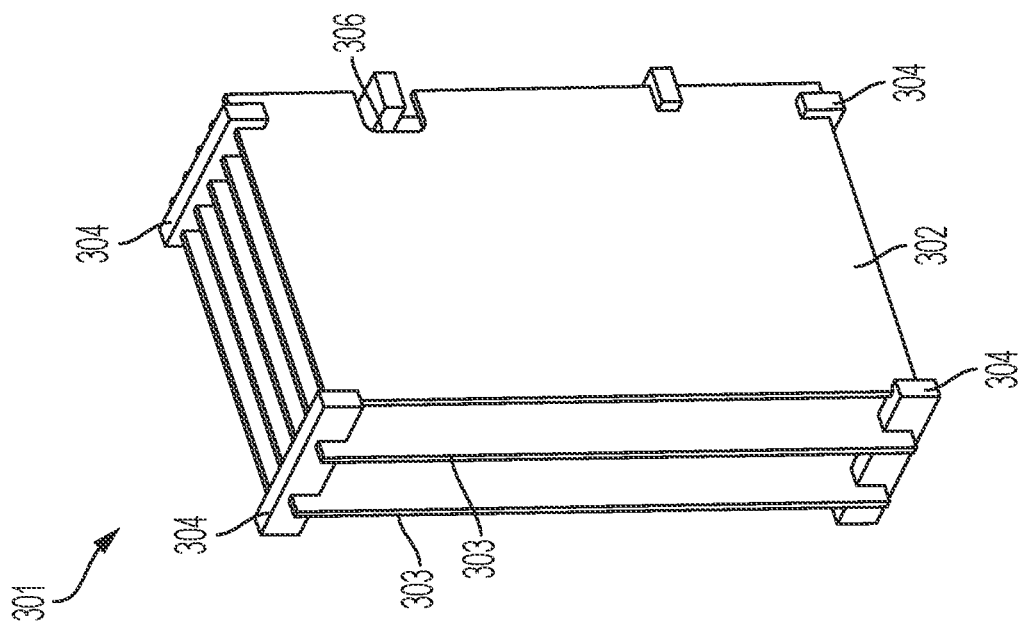
FIG. 3 shows a perspective view of a particle collection assembly.

FIG. 3 shows a perspective view of a particle collection structure 301. FIG. 4 shows a different perspective view of the particle collection structure 301 shown in FIG. 3. The particle collection structure 301 may include repelling electrode plates 302 and collecting electrode plates 303. The collecting electrode plates 303 alternate with the repelling electrode plates 302. The alternating plates may be mechanically connected by non-conductive support elements 304. One or more of the non-conductive support elements 304 may be connected to or integrated with a frame.

The supports may have conductive or static dissipative portions and nonconductive portions to simplify the configuration of the plates and avoid the "cut-outs" and serve the support function and the electrical connection function in the same element while maintaining electrical isolation between the collecting electrode plates and repelling electrode plates. Such support elements could be assembled from multiple parts, have portions of the surface be conductive, for example by having a conductive coating or being treated to affect conductivity or be made by overmolding.

The support elements could be multi-material, utilizing non-conductive and conductive materials in the same component to serve both support and electrical connection/isolation functions without needing the "cut-out area 306" shown in FIG. 4.

These multi-material supports could be co-molded, overshot molded, or simply two pieces snapped/glued/etc. together.

Conductive elements 305 may electrically connect collecting electrode plates 303 and may in addition have a support function. The conductive support elements 305 may have notches matching a configuration of the collecting electrode plates 303 to facilitate assembly. The repelling electrode plates 302 may have a configuration which provides electrical isolation from the conductive elements 305. The configuration may be a cut-out area 306.

The repelling electrode plates 302 may be electrically connected by a conductive repelling electrode plate support 307. The collecting electrode plates 303 may have cut-out areas 308 to electrically isolate the collecting electrode plates 303 from the conductive repelling electrode plate support 307.

The set of repelling electrode plates 302 electrically connected by the conductive repelling electrode plate support 307 make up the repelling electrode. The set of collecting electrode plates 303 as connected by the conductive element 305 make up the collecting electrode. The collecting electrode assembled with the repelling electrode makes up the particle collection structure 301. The particle collection structure 301 may be assembled from the same material or materials sufficiently similar to be recyclable without being broken down and being speared into separately recyclable components.

The supports may have conductive portions and nonconductive portions to simplify the configuration of the plates and avoid the "cut-outs" and serve the support function and the electrical connection function in the same element while maintaining electrical isolation between the collecting electrode plates and repelling electrode plates. Such support elements could be assembled from multiple parts, have portions of the surface be conductive, for example by having a conductive coating or being treated to affect conductivity or be made by over-molding. The support elements could be multi-property elements, utilizing non-conductive and conductive materials in the same component to serve both support and electrical connection/isolation functions without needing the "cut-out area 306" shown in FIG. 4.

Figure 4A:
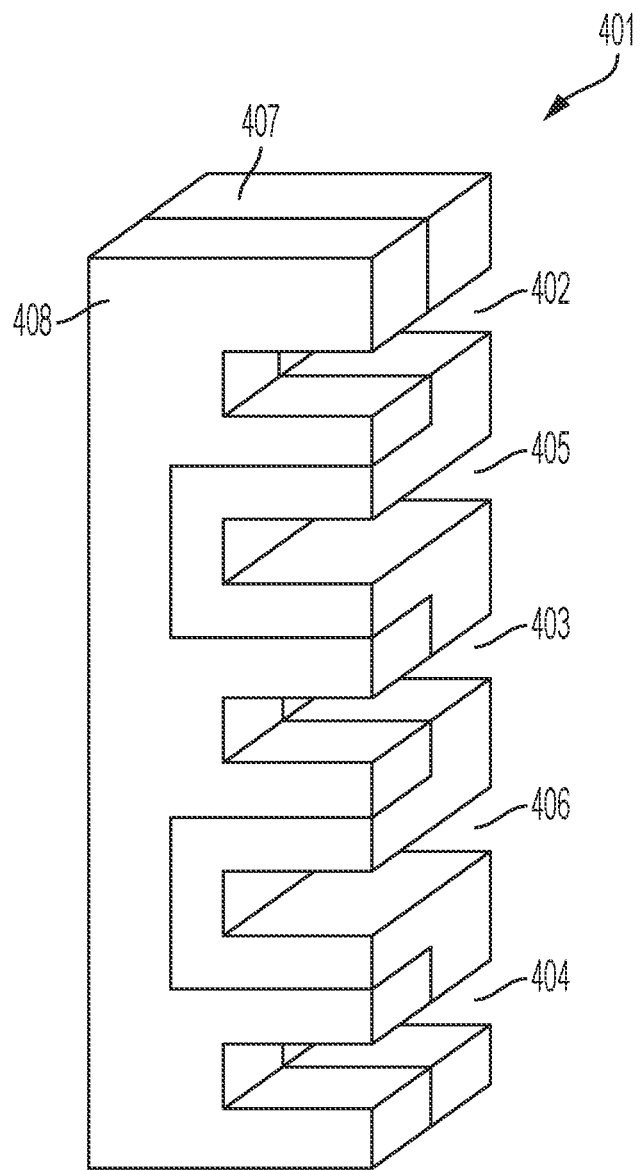
FIG. 4A shows a multi-property support.

FIG. 4A shows multi-property support 401. The multi-property support may have a portion 408 with a conductive property and a portion 407 with a non-conductive property. Portions 407 and 408 may be fabricated by being co-molded, overshot molded, partially coated, or by having two pieces snapped, glued, screwed, riveted, or otherwise joined together. The multi-property support 401 may have alternating slots. For example, slots 402, 403, and 406 may be electrically connected by portion 408 with a conductive property and electrically isolated from slots 405 and 406 in the nonconductive portion 407.

Figure 5:
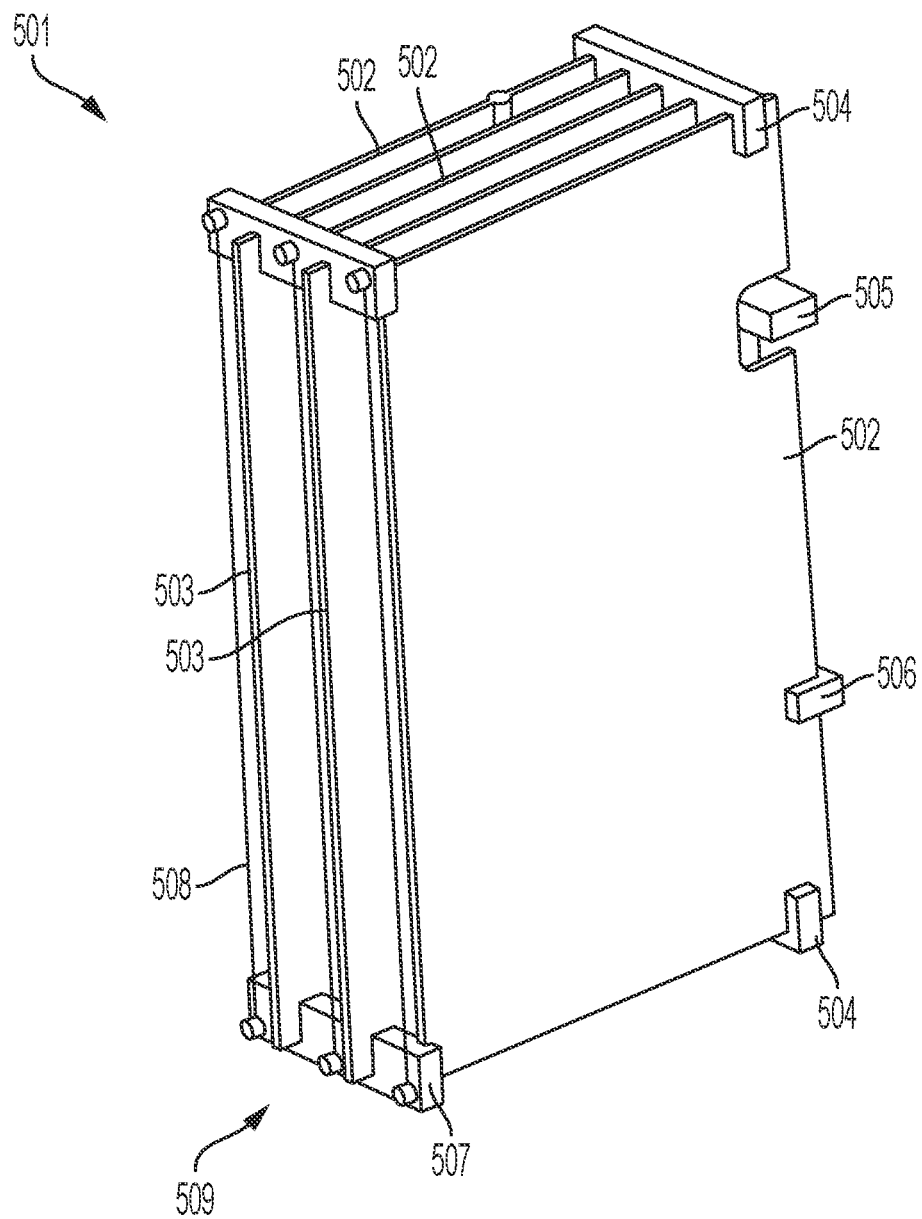
FIG. 5 shows a particle collection assembly with a corona electrode.

FIG. 5 shows a particle collection structure 501 with a corona electrode 508. The particle collection structure 501 may have conductive synthetic polymer repelling electrode plates 502. The particle collection structure 501 may have collecting electrode plates 503 made of conductive synthetic polymer materials. Non-conductive support elements 504 and 507 are provided to mechanically connect the collecting plates 503 and plates 502 in a particle collection structure 501. The non-conductive plates support 507 may include a corona wire support 509. The corona wire support 509 may be integral with the non-conducive plate support 507. A conductive repelling plate support 505 may be provided to electrically connect the repelling plates and a conductive collecting plate support 506 may be provided to electrically connect the repelling electrode plates 502. The corona electrode 508 may be a thin wire. The non-conductive plate support may have a corona electrode support 509. A separate exciting electrode may be provided in the form of a conductive mesh positioned close to the end of the particle collection structure 501 which carries the corona electrode. The number of components required for a precipitator is reduced by eliminating the need for a separate ionizer assembly. In addition, the corona wire is replaced each time the particle collection structure 501 is replaced thereby eliminating the potential failure of a permanently installed corona wire or eliminating the need to have separate replaceable ionizer components and particle collection assemblies.

Figure 7:
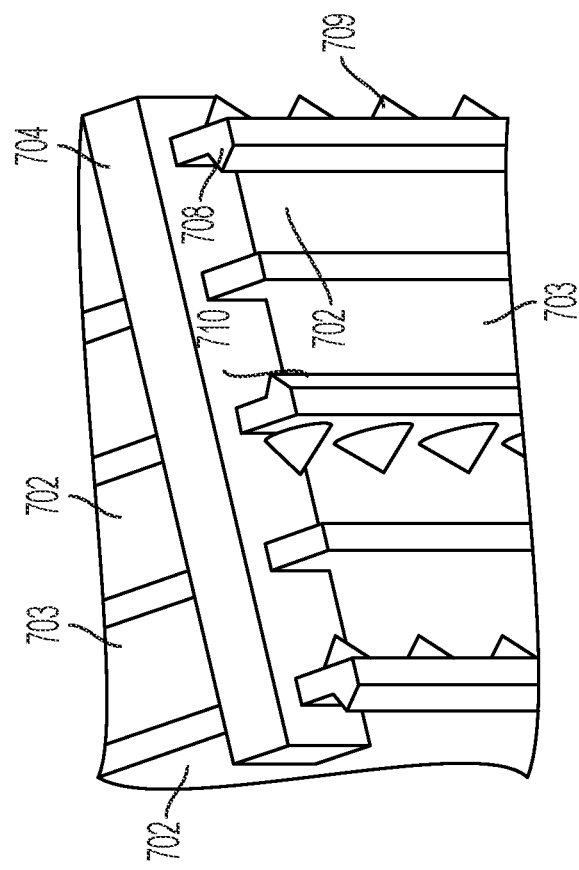
FIG. 7 shows an enlarged view of a portion of the embodiment of a particle collection assembly shown in FIG. 6.
Figure 6:
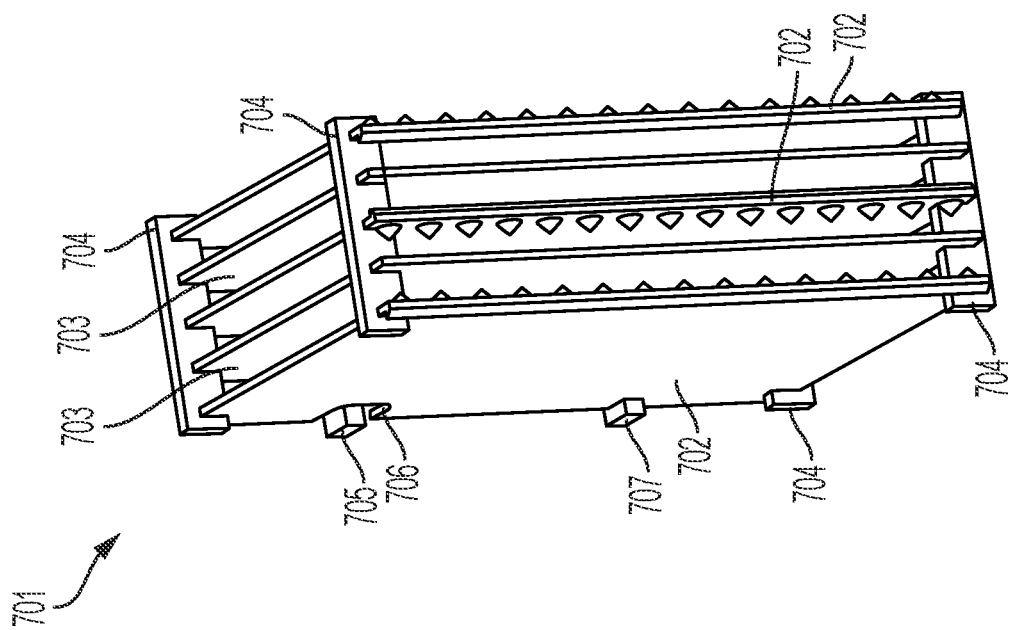
FIG. 6 shows an embodiment of a particle collection assembly.

FIG. 6 and FIG. 7 show an embodiment of a particle collection structure 701 with conductive synthetic polymer repelling electrode plates 702, and conductive synthetic polymer collecting electrode plates 703. Conductive synthetic polymer collecting electrode plates 703 may be made from a conductive synthetic polymer such as molded conductive plastic. The particle collection structure 701 may have collecting electrode plates 703 made of a conductive synthetic polymer. Repelling electrode plates 702 may also be made of a conductive synthetic polymer. The repelling electrode plates may be electrically and mechanically connected to each other by a conductive repelling electrode support element 707. The conductive repelling electrode support element 707 and the collecting plates are configured so as to be mechanically and electrically isolated by cut-outs (not shown in FIG. 6) but have a similar geometric configuration as cut-outs 307 shown in FIG. 4. The conductive synthetic polymer collecting electrode plates 703 are mechanically and electrically connected by a conductive collecting electrode support element 705 and isolated from the repelling electrode plates 702 by the cut-out configuration 706.

Non-conductive support elements 704 may be provided to connect the collecting electrode plates and the repelling electrode plates and maintain spacing therebetween. The repelling electrode plates may alternate with the collecting electrode plates. The repelling electrode plates 702 may include molded or integral features with a short diameter to act as ion emissions sights. FIG. 7 shows an extended ridge 708 having a pointed or knife-like edge 710. The repelling electrode plates may include other configurations or shapes having a small diameter to act as ion emissions sights. For example, pointed cone 709 may be molded into repelling electrode plates. In this manner, the function of the corona electrode and repelling electrode may be combined in a single physical structure. The pointed ridge structure 708 may run the length of the repelling electrode but may also be discontinuous. The ion emitting sights may be in a single row near the beginning edge of the repelling electrodes (from an airflow perspective) or may be distributed. The collecting electrode plates 703 may be formed in a manner to increase surface area. The collection surface of a smooth plate can be enhanced by having a roughened surface. The formation of the collecting electrode plates may be by injection molding with a foaming agent applied to the mold. The surface area may also be enhanced by mechanically or chemically etching the surface of the collection plates. The surface area may also be enhanced by the application of particles or disbursed liquid which will be collected or solidified on the collecting plates.

Figure 8:
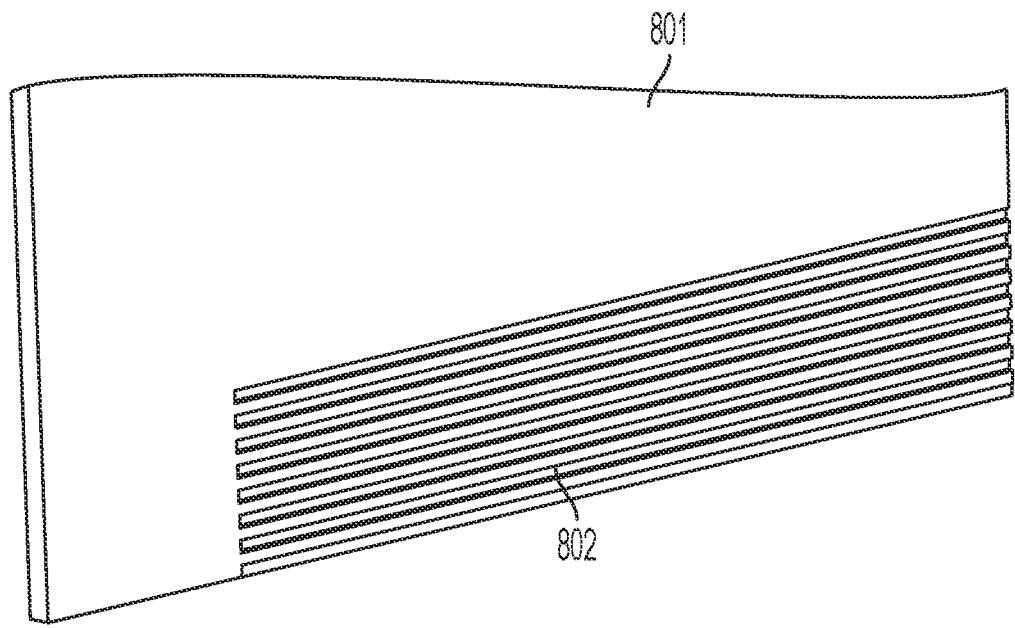
FIG. 8 shows a conductive synthetic polymer electrode plate with molded-in features.

FIG. 8 shows a conductive synthetic polymer electrode plate 801 with molded-in features 802. The molded-in feature 802 may be channels that may influence the airflow dynamics and enhanced the surface area. The molded features may be present in a repelling electrode plate and/or a collecting electrode plate. Providing the molded-in features on the collecting electrode plate is particularly advantageous.

Figure 9:
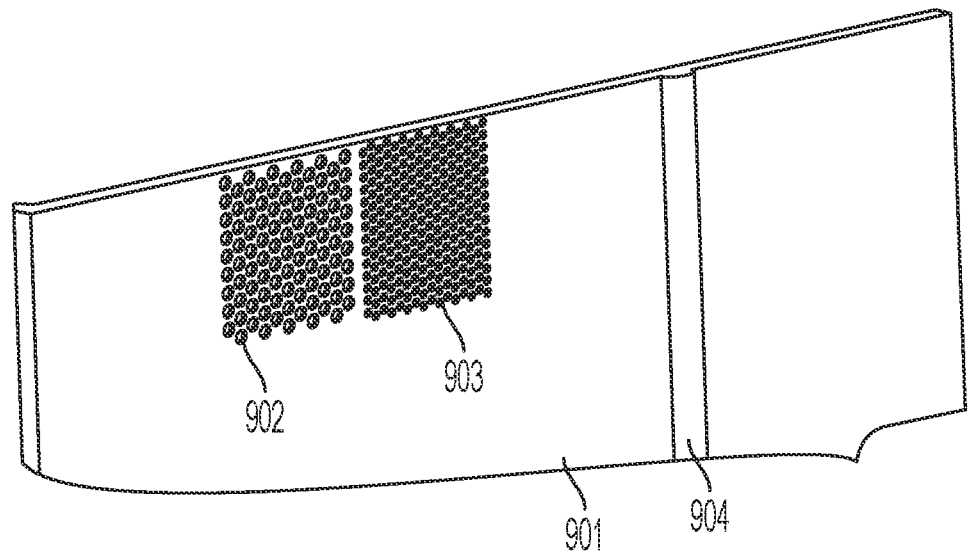
FIG. 9 shows a conductive synthetic polymer electrode plate with a molded-in strut.
Figure 9A:
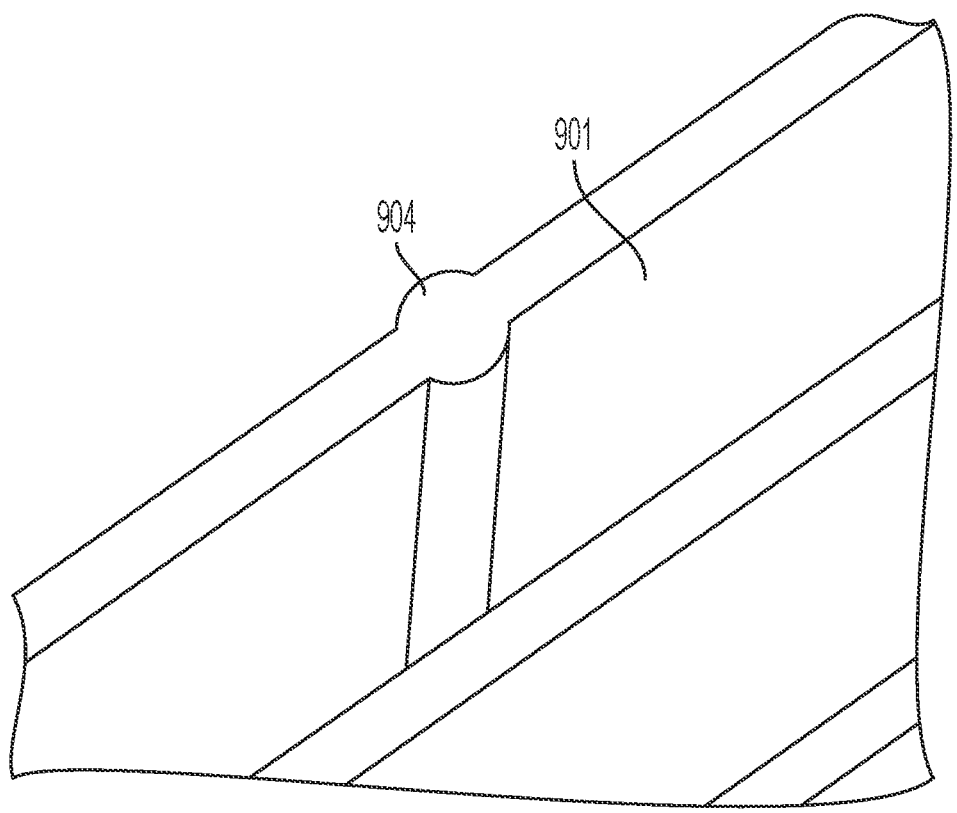
FIG. 9A shows a zoomed-in view of a molded-in strut.

FIG. 9 shows an embodiment of an electrode plate 901 with molded-in features 902, 903. The molded-in features 902 are shown as a series of holes or indents molded into the surface of 901. Molded-in features 903 may, for example, be a series of holes or indentations on the surface or extending through the plates. The molded-in features 902 are smaller in the embodiment illustrated than the features 903. The features may be molded in the surface of the plate during an injection molding fabrication process or may be created mechanically after the plates are molded. The features may be indentations or through holes. Through holes may reduce the weight and amount of material required. Through holes may be provided in the particle collecting electrode plates. Through holes may be advantageous to the repelling electrode plates because surface area is not as significant of a consideration as with the collecting electrode plates. The primary function of the repelling electrode plates is to assist in establishing the electric field, which function is not impaired by such through holes. FIG. 9 shows a strengthening ridge 904 which may also be molded into the conductive synthetic polymer of the electrode plate 901.

Figure 10:
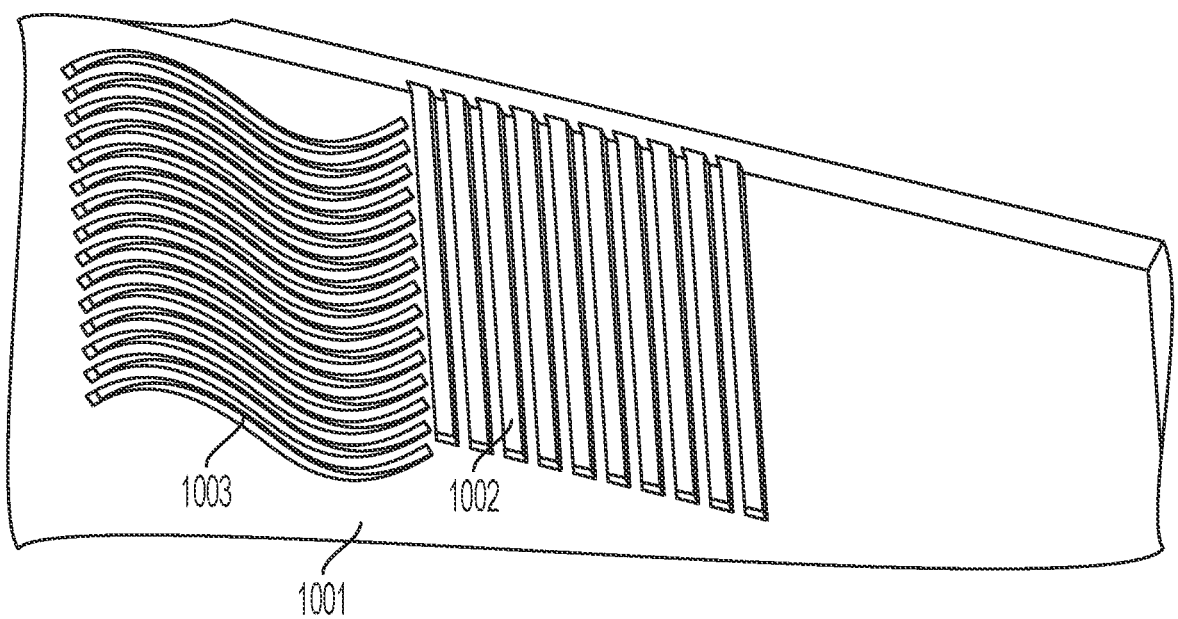
FIG. 10 shows an electrode plate made of a conductive synthetic polymer having surface features.

FIG. 10 shows an electrode plate 1001 made of a conductive synthetic polymer having surface features 1002 and 1003. Surface features 1002 are illustrated as horizontally extending grooves and surface 1003 are illustrated as wavy grooves. The surface features may cover a portion of the electrode plate or the entire electrode plate. The surface features may be molded into the electrode plate or may be mechanically or chemically cut into the electrode plate. Surface features may be provided for disruption of airflow or to enhance the surface area of an electrode plate.

Figure 11:
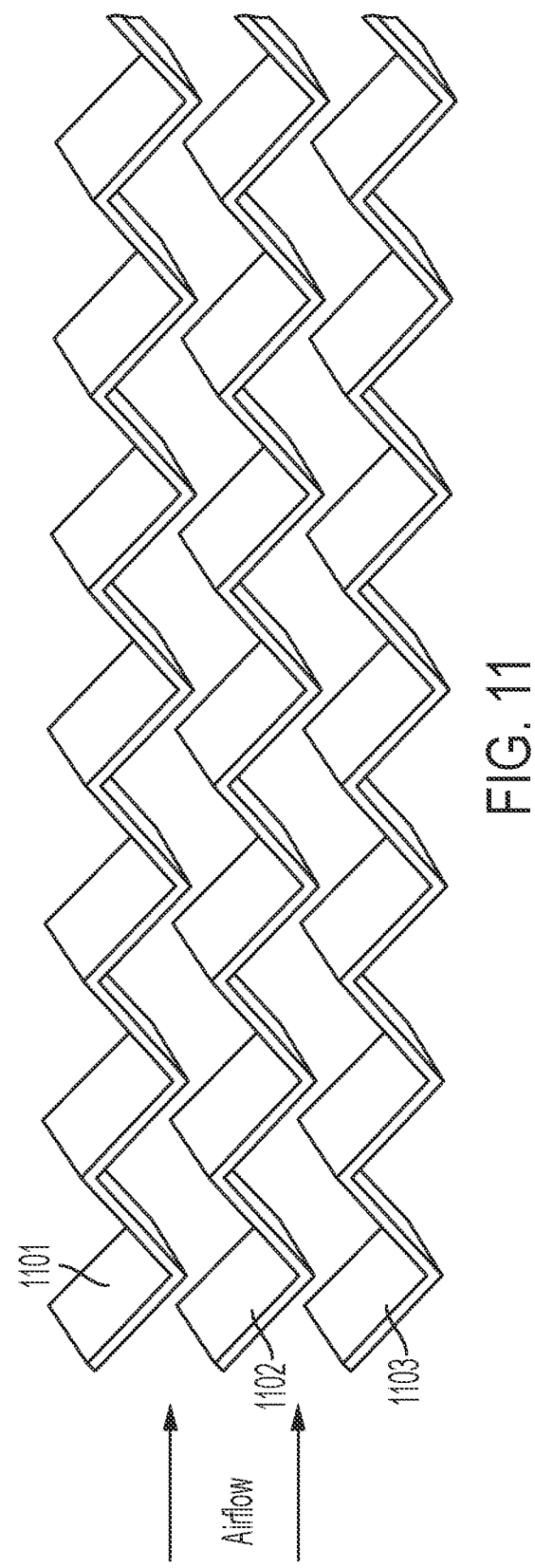
FIG. 11 shows molded electrode plates with a zig-zag configuration for use in electrostatic air filter particle collection assembly.

FIG. 11 shows molded electrode plates for use in electrostatic air filter particle collection structure. The electrode plates 1101, 1102, and 1103 may be in a zig-zag configuration. When assembled, the electrode plates may alternate between the collecting electrode plates and the repelling electrode plates. FIG. 11 shows only 3 electrode plates for purposes of illustration; however, it is to be understood that more than 3 electrode plates may be in a particle collection structure. In addition, FIG. 11 shows long narrow zig-zag-shaped plates. The fabrication molding process admits to multiple configurations and shapes. The respective electrode plates may be wide or may be composed of multiple sets of strips depending on the desired airflow/airflow disruption pattern for a particle application of an electrostatic air cleaner. It is a significant advantage of utilizing molded conductive synthetic polymer electrode plates that the plates may be easily tailored to the space available for a particular application. For example, collecting electrode plates may be fabricated to match the size of a conduit such as an air duct into which they will be installed. In certain applications, air duct conduits have complex shapes and the molded conductive synthetic polymer collecting electrode plates and repelling electrode plates are particularly suitable for being configured for such installations. For example, air ducts in automotive applications often follow a non-linear path alternating repelling electrode plates and collecting electrode plates may be installed in a wide variety of configurations for a vast array of applications including retrofitting existing complex conduits. The electrode plates 1101, 1102, and 1103 are shown parallel to each other in FIG. 11. The plates may be configured to converge so that the distance between the repelling and collecting electrode plates decreases over the airflow path. The distance between the plates should not be less than the dielectric breakdown distance for the voltage of the respective electrode plates.

Figure 12:
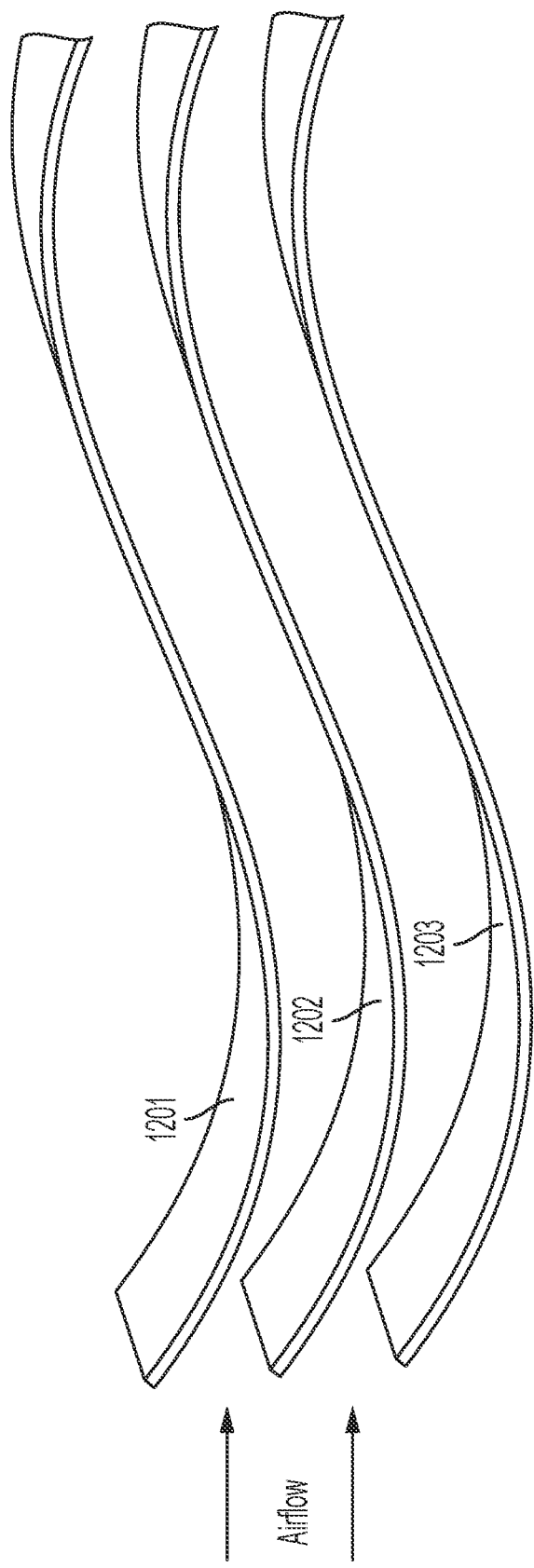
FIG. 12 shows molded electrode plates with a wave configuration for use in a collector assembly of an electrostatic air filter or air cleaner.

FIG. 12 shows an alternative configuration of molded electrode plates for use in a collector assembly of an electrostatic air filter or air cleaner. The plates 1201, 1202, and 1203 are shown in a parallel wave configuration. Other configurations are possible. When assembled, the electrode plates may alternate between the collecting electrode plates and the repelling electrode plates. FIG. 12 shows only 3 electrode plates for purposes of illustration; however, it is to be understood that more than 3 electrode plates may be in a particle collection structure. In addition, FIG. 11 shows long narrow wave-shaped plates. The fabrication molding process admits to multiple configurations and shapes. The respective electrode plates may be wide or may be composed of multiple sets of strips depending on the desired airflow/airflow disruption pattern for a particular application of an electrostatic air cleaner. It is a significant advantage of utilizing molded conductive synthetic polymer electrode plates that the plates may be easily tailored to the space available for a particular application. For example, collecting electrode plates may be fabricated to match the size of a conduit such as an air duct into which they will be installed. In certain applications, air duct conduits have complex shapes and the molded conductive synthetic polymer collecting electrode plates and repelling electrode plates are particularly suitable for being configured for such installations. For example, air ducts in automotive applications often follow a non-linear path alternating repelling electrode plates and collecting electrode plates may be installed in a wide variety of configurations for a vast array of applications including retrofitting existing complex conduits. The electrode plates 1201, 1202, and 1203 are shown in parallel to each other in FIG. 12. The plates may be configured to converge so that the distance between the repelling and collecting electrode plates decreases over the airflow path. The distance between the plates should not be less than the dielectric breakdown distance for the voltage of the respective electrode plates.

An advantage of the configurations in FIGS. 11 and 12 is that the airflow path is not in a straight line. The non-straight line airflow path will result in an increased number of collisions of lionized particles into the electrode plates thereby increasing the number of collected particles. The configuration and shape of the electrode plates may be set to establish disruption in the airflow pattern thereby creating additional turbulence and increasing the incidents of particle collisions with the electrode plates.

Figure 13:
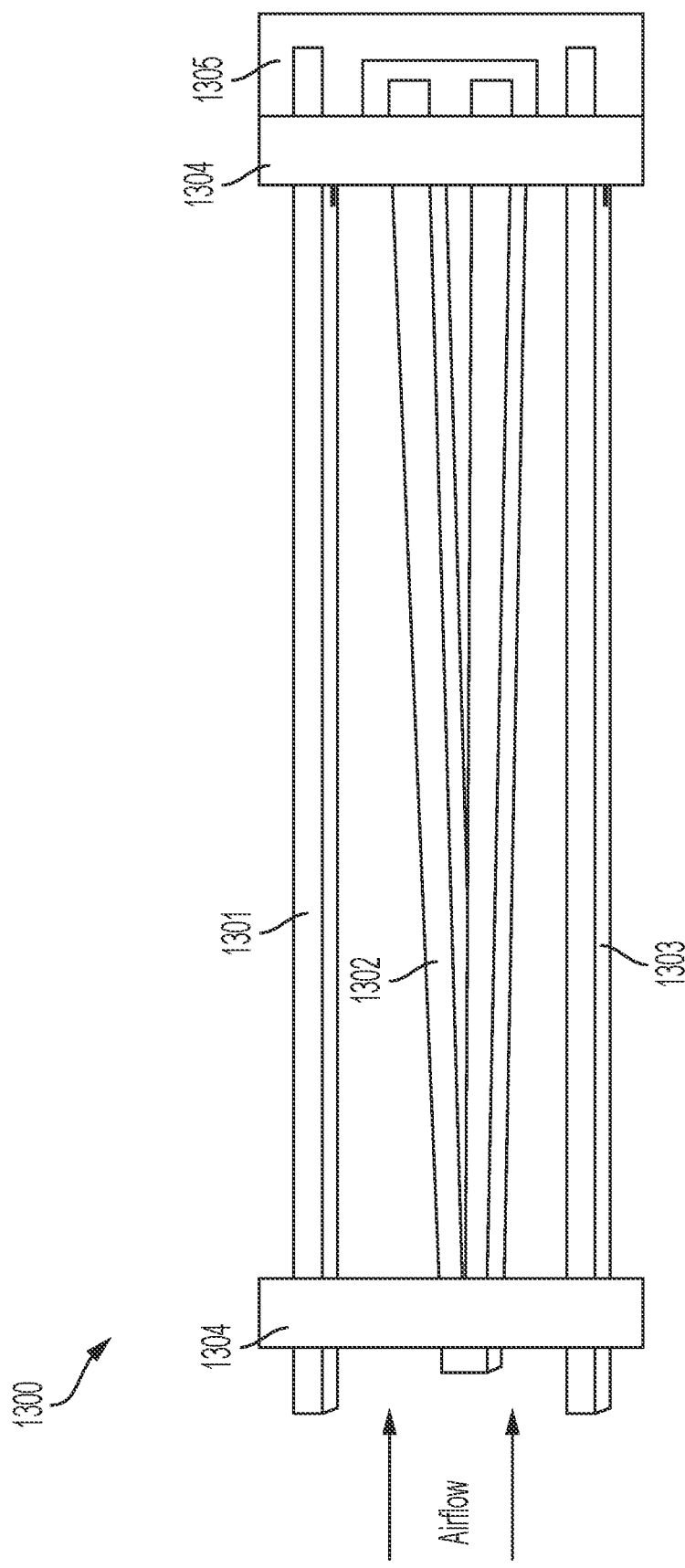
FIG. 13 shows a particle collection assembly for an electrostatic air filter with converging repelling and collecting electrode plates.

FIG. 13 shows a particle collection structure for an electrostatic air filter 1300. FIG. 13 shows parallel repelling electrode plates 1301 and 1303 and a "V" shaped collecting electrode plates 1302. Electrode plate 1302 is a collecting electrode plate. FIG. 13 shows the collecting electrode plate 1302 flanked by repelling electrode plates 1301 and 1303. It is understood that the particle collection structure may have a greater number of electrode plates alternating between particle collecting electrode plates and repelling electrode plates. FIG. 13 shows one embodiment of converging electrode plates in an electrostatic particle collection assembly. Other configurations may be functionally equivalent. The electrodes may converge in an airflow passage that has a greater cross-section at an inlet end than an outlet end. The particle collecting electrodes may be solid, i.e. triangular rather than V-shaped, or the particle collecting electrode may be a planar and the repelling electrode may have an increased width at an outlet end of the airflow passage of the particle collecting structure. The ionized particles may enter into the particle collecting assembly 1300 and may be more efficiently collected with a set of electrode plates which are initially further apart and converge along the flow path. In such a configuration, larger particles may be collected closer to the inlet portion of the collector assembly, while smaller particles which have lower mass and lower charges may be collected closer to the trailing end of the collector assembly. The converging electrode configuration shown in FIG. 13 will tend to have a more even particle distribution over the length of the collection assembly and will tend to collect a greater portion of ionized particles with parallel repelling and collecting electrode plates. Because the electrical field strength increases as the distance between particle collecting plates and repelling electrode plates decreases, the converging distance between such plates increases the collection of smaller particles (carrying fewer charged ions). The repelling plates 1301 and 1303, together with the collecting electrode plates 1302 are advantageously fabricated of conductive synthetic polymers. Non-conductive support elements 1303 may be provided to mechanically connect the electrode plates. Conductive support structure 1305 may be provided to electrically connect the respective types of electrode plates to each other. The relative configurations of the conducting support structures 1305, the repelling electrode plates 1301, 1303, and the collecting electrode plates 1302 may be such that the repelling electrode plates are electrically isolated from the collecting electrode plates. This may be accomplished by appropriately positioned cut-outs in the electrically conductive members 1304 and respective electrode plates. The electrically conductive structures 1304 may also provide a mechanical support function.

Figure 14:
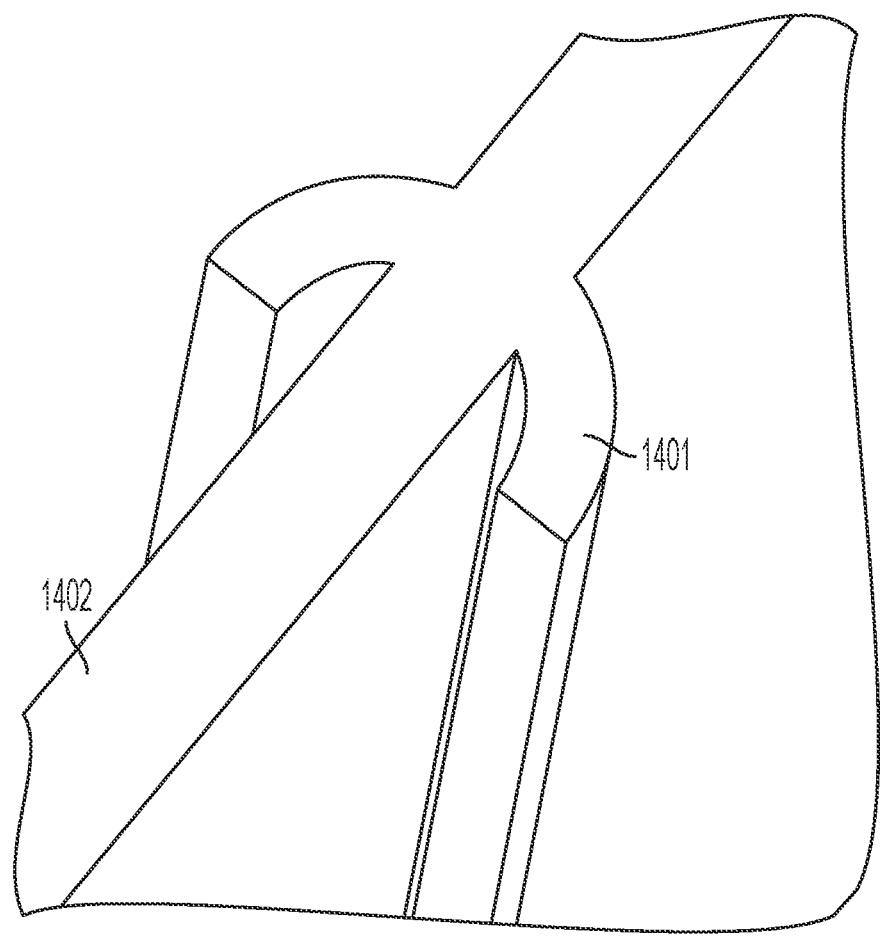
FIG. 14 shows a conductive synthetic polymer collecting electrode plate with molded protruding surface features.

FIG. 14 shows an alternative molded feature 1401 in a conductive synthetic polymer collecting electrode plate 1402. The use of conductive thermoplastic permits flexibility and the creation of diverse configurations for the electrode plates. The conducive synthetic polymer admits of multiple shapes and configurations designed to disrupt airflow patterns and enhance surface area and enhance particle collection.

Figure 15:
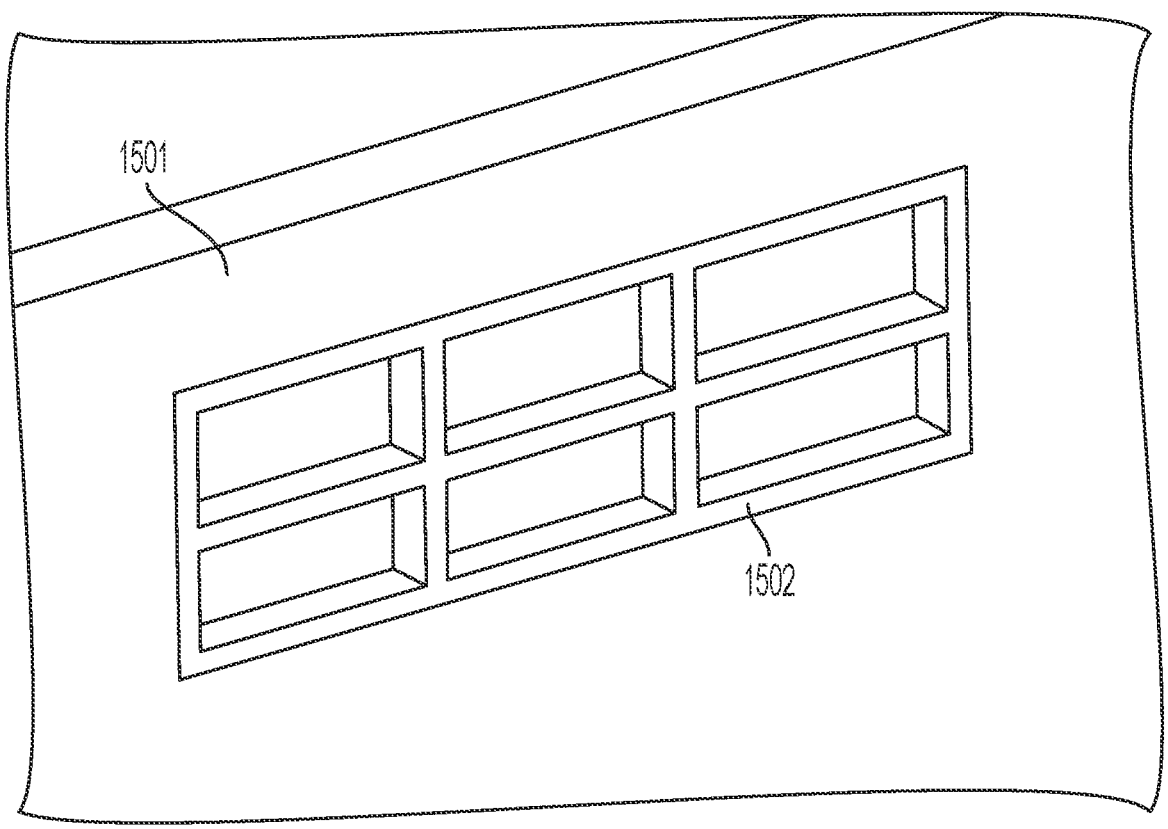
FIG. 15 shows a collecting electrode plate having a raised windowpane structure.
Figure 16:
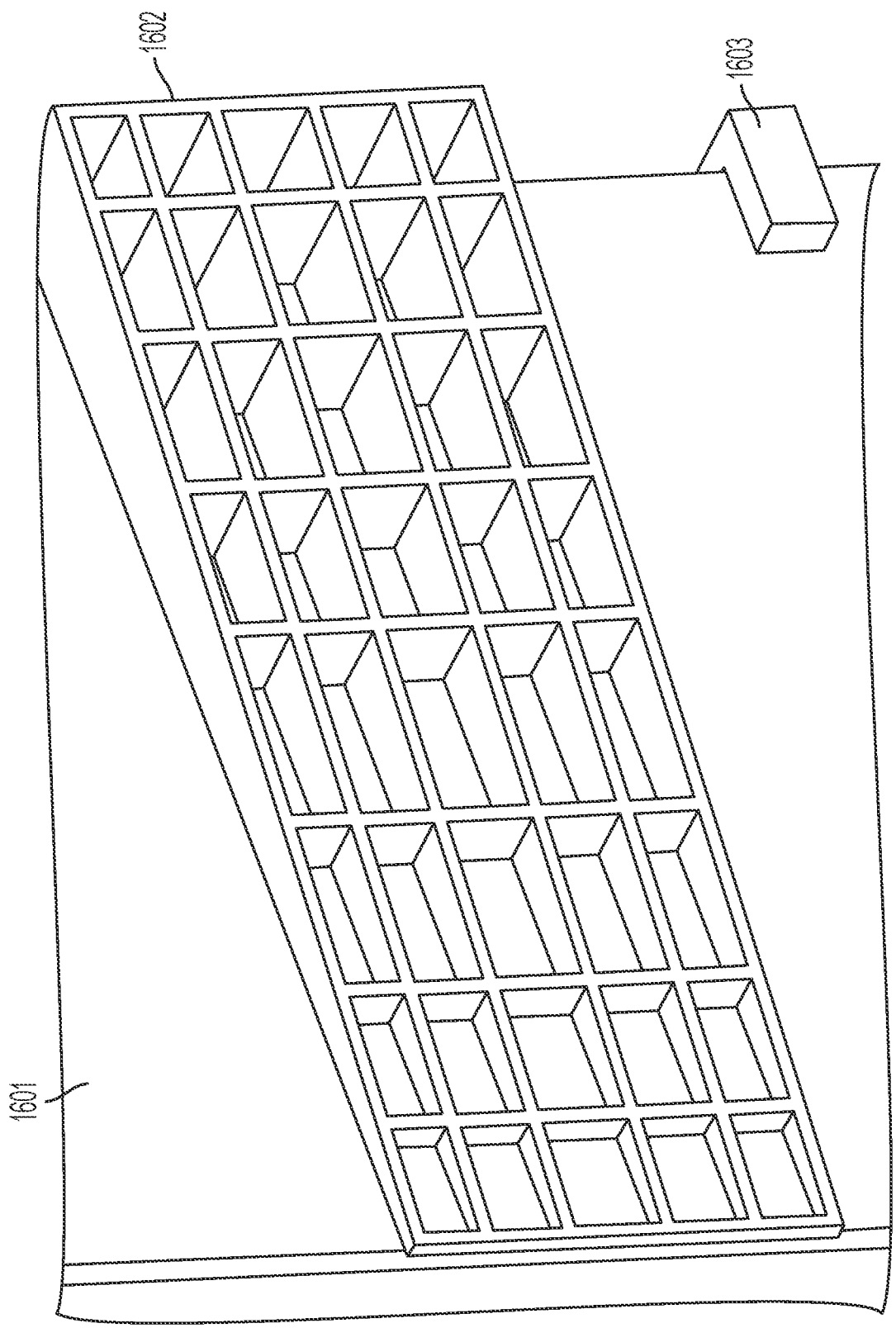
FIG. 16 shows a collecting electrode plate having a ramped windowpane structure.

FIGS. 15 and 16 show alternative configurations of collecting electrode plate geometry. FIG. 15 shows a collecting electrode plate 1501 having a raised windowpane structure on one of its major surfaces. The raised windowpane structure may be over-molded or integrally molded with the electrode plate as a sub-structure. The raised windowpane 1502 may be of the same material as the collecting plate 1501 or may be of a different material than the collecting electrode plate structure 1501. The raised windowpane structure 1502 may be conductive or non-conductive material. Raised structures may have configurations other than the illustrated windowpane structure. The raised structure provides a surface area for particle collection which is closer to the repelling electrodes than purely parallel planar repelling in collecting electrodes. In addition, raised structures on the collecting electrode plates may induce turbulent airflow through the particle collection structure. The use of conductive synthetic polymer which may be molded provides the flexibility to create a broad range of configurations. The raised structure may cover more or less of the surface of the collecting electrode plate 1501 than shown in FIG. 15.

FIG. 16 shows a collecting electrode plate having a ramped windowpane structure. FIG. 16 shows a planar electrode plate 1601 with a ramped raised structure 1602 superimposed on the surface of the planar electrode plate structure 1601. The ramped raised structure 1602 may be conductive or non-conductive material. The ramped raised structure 1602 may be over-molded or integrally molded with the electrode plate as a sub-structure. The ramped raised structure 1602 may be of the same material as the collecting plate 1601 or may be of a different material than the collecting electrode plate structure 1601. Raised structures may have configurations other than the illustrated ramped windowpane structure. The raised structure provides a surface area for particle collection which is closer to the repelling electrodes than purely parallel planar collecting electrodes. In addition, ramped raised structures on the collecting electrode plates may induce turbulent airflow through the particle collection structure. The use of conductive synthetic polymer which may be molded provides the flexibility to create a broad range of configurations. The raised structure 1602 may cover more or less of the surface of the collecting electrode plate 1601 than shown in FIG. 16. If more than one particle collecting electrode plate is utilized in an electrostatic air filter, a conductive bracket 1603 may be used to electrically connect collecting electrode plates. A ramped windowpane structure made of conductive material combines the advantages of a windowpane structure (potential high particle load capacity) with the advantages of the "V-shaped electrodes" as shown in FIG. 13, including establishing an increased field strength in areas where the distance between conductive ramp structures and repelling electrode plate surface is reduced.

Figure 17:
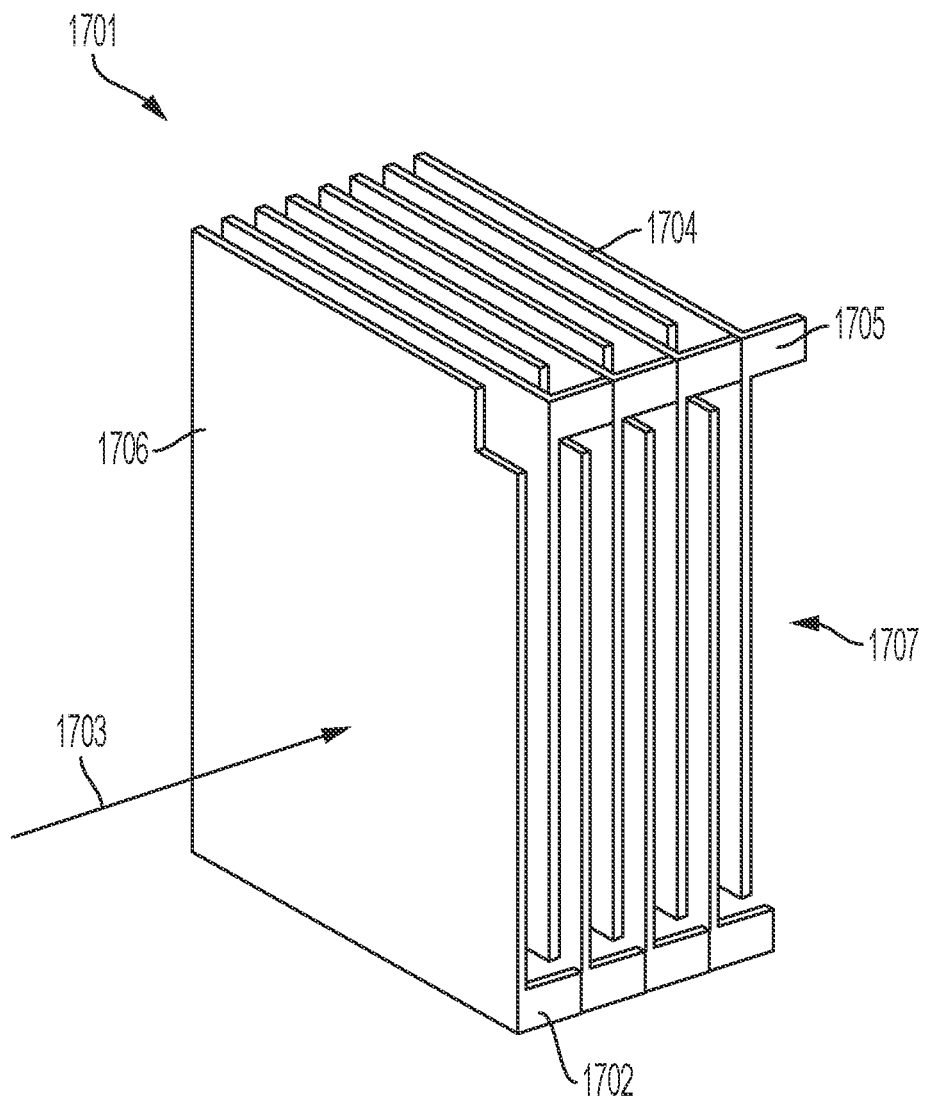
FIG. 17 shows an embodiment of a particle collection electrode plate assembly.

FIG. 17 shows a particle collection electrode plate assembly 1701 with several particle collection electrode elements 1706 and alternating repelling electrode elements 1707. Particle collecting electrode elements 1706 may include particle collecting electrode plates 1703 and connecting legs 1702. Particle collecting electrode elements 1706 may be formed from conductive polymer material, static dissipative polymer material, or a combination of conductive polymer material and static dissipative polymer material. The legs 1702 may be conductive or static dissipative. The legs 1702 and the plates 1703 may both be conductive or may both be static dissipative. The legs 1702 may be conductive and the plates 1703 may be static dissipative. The legs 1702 may be static dissipative and the plates 1703 may be conductive.

Repelling electrode elements 1707 may include repelling electrode plates 1704 and connecting legs 1705. Repelling electrode elements 1707 may be formed from a conductive polymer material, static dissipative polymer material, or a combination of conductive polymer material and static dissipative polymer material. The legs 1705 may be conductive or static dissipative. The legs 1705 and the plates 1704 may both be conductive or may both be static dissipative. The legs 1705 may be conductive and the plates 1704 may be static dissipative. The legs 1705 may be static dissipative and the plates 1704 may be conductive. To the extent that the electrode elements 1706 or 1707 are formed from both conductive polymer material and static dissipative polymer material, the fabrication technique may be the same as that of the dissimilar materials shown and described in connection with FIG. 4A.

The particle collection electrode elements 1706 and alternating repelling electrode elements 1707 may be thermoplastic or other moldable material. The particle collection electrode elements 1706 may be connected to each other at the legs 1702 by a snap-together arrangement, may be glued together using glue in a fashion that does not electrically isolate the particle collection electrode elements 1706, may be welded together or may be fixed together by mechanical elements such as a connecting rod or screws. The repelling electrode elements 1707 and particle collection electrode elements 1706 should be electrically isolated from each other but may be connected by non-conductive supports such as elements 704 (FIG. 6). The repelling electrode elements 1707 may be connected to each other at the legs 1705 by a snap-together arrangement, may be glued together using glue in a fashion that does not electrically isolate the repelling electrode elements 1707, may be welded together or may be fixed together by mechanical elements such as a connecting rod or screws.

The design according to FIG. 17 has the advantage of being easily fabricated in individual electrode elements 1706 and 1707 through a molding process. The individual elements may be easily treated to affect the surface area and other surface configuration features individually prior to assembly 1701. FIG. 17 shows the stacked legs 1702 and 1705 on opposite ends of a side of the assembly 1701 however the connecting arrangements may be diagonally across from each other. A diagonal arrangement has the further advantage of a greater linear distance between the connecting points of the electrode sets. The embodiment shown in FIG. 17 may be configured so that a single mold could be used for both the repelling electrode elements 1707 and the collecting electrode elements 1706.

The techniques, processes, and apparatus described may be utilized to control the operation of any device and conserve the use of resources based on conditions detected or applicable to the device.

What is claimed is:

1. An electrostatic air precipitator electrode system comprising: a corona electrode; a collecting electrode in close proximity to said corona electrode, wherein said collecting electrode is a conductive synthetic polymer material; and a repelling electrode positioned to cooperate with said collecting electrode wherein said repelling electrode is a conductive synthetic polymer material; wherein said repelling electrode further comprises at least one ion emitting structure integrated with said repelling electrode.

2. An electrostatic air precipitator electrode system according to claim 1 wherein at least one of said conductive synthetic polymer materials includes at least a synthetic polymer material having a resistivity of $10^1$-$10^{12}$ ohm/sq.

3. The electrostatic air precipitator electrode system according to claim 1 wherein said repelling electrode includes 3 or more repelling electrode plates and said collecting electrode includes two or more collecting electrode plates electrically connected to each other and arranged between repelling electrode plates.

4. The electrostatic air precipitator electrode system according to claim 3 wherein said repelling electrode plates are electrically and mechanically connected by conductive connecting brackets.

5. The electrostatic air precipitator electrode system according to claim 4 wherein said collecting electrode plates and said repelling electrode plates are connected by conductive connecting brackets.

6. The electrostatic air precipitator electrode system according to claim 5 wherein said conductive connecting brackets are composed of conductive material and non-conductive material and are configured to mechanically connect said collecting electrode plates and said repelling electrode plates and to electrically isolate conducting electrode plates from repelling electrode plates.

7. The electrostatic air precipitator electrode system according to claim 6 further comprising non-conducting connecting brackets to mechanically connect collecting electrode plates and repelling electrode plates and wherein said brackets include corona wire mounting elements.

8. An electrostatic air precipitator electrode system according to claim 6 wherein said collecting electrode plates and said repelling electrode plates are configured such that said repelling electrode plates and collecting electrode plates are mechanically isolated in the area of an electrical connection between collecting electrode plates and in the area of an electrical connection between repelling electrode plates.

9. An electrostatic air precipitator electrode system according to claim 6 wherein said collecting electrode plates are formed in a manner to yield an enhanced surface area.

10. An electrostatic air precipitator electrode system according to claim 9 wherein said collecting electrode plates are formed by a molding process that imparts an enhanced surface area to said collecting electrode plates.

11. An electrostatic air precipitator electrode system according to claim 9 wherein said collecting electrode plates are formed by a process that includes a mechanical treatment to enhance surface area of said collecting electrode plates.

12. An electrostatic air precipitator electrode system according to claim 9 wherein said collecting electrode plates are formed by a process that includes a chemical treatment to enhance surface area of said collecting electrode plates.

13. An electrostatic air precipitator electrode system according to claim 9 wherein one or more of said collecting electrode plates and said repelling electrode plates exhibit additional features that disrupt laminar airflow through said electrostatic air precipitator.

14. An electrostatic air precipitator electrode system according to claim 13 wherein one or more of said collecting electrode plates and said repelling electrode plates exhibit integral features to enhance rigidity.

15. An electrostatic air precipitator electrode system according to claim 6 wherein said collecting electrode plates are not planar and said repelling electrode plates are non-planar and parallel to said collecting electrode plates.

16. An electrostatic air precipitator electrode system according to claim 6 wherein said collecting electrode plates and said repelling electrode plates are arranged in an airflow path through said electrostatic electrode system and define airflow passages between adjacent collecting electrode plates and repelling electrode plates and wherein said at least one of said airflow passages has a larger cross section at an inlet end of said electrode system and a smaller cross section at an outlet end of said at least one of said airflow passages.

17. An electrostatic air precipitator electrode system according to claim 6 wherein said collecting electrode plate exhibits a raised windowpane element on a collecting surface of at least one of said collecting electrode plates.

18. An electrostatic air precipitator electrode system according to claim 17 wherein said raised windowpane element is a ramped windowpane element.

* * * * *